(12) United States Patent
Minegishi

(10) Patent No.: US 9,875,067 B2
(45) Date of Patent: Jan. 23, 2018

(54) INFORMATION PROCESSING APPARATUS, COMPUTER-READABLE RECORDING MEDIUM, AND INFORMATION PROCESSING SYSTEM

(71) Applicant: Youichi Minegishi, Kanagawa (JP)

(72) Inventor: Youichi Minegishi, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/065,983

(22) Filed: Mar. 10, 2016

(65) Prior Publication Data

US 2016/0274825 A1    Sep. 22, 2016

(30) Foreign Application Priority Data

Mar. 20, 2015    (JP) .................................. 2015-058801

(51) Int. Cl.
*H04N 1/04* (2006.01)
*G06F 3/12* (2006.01)
*H04N 1/00* (2006.01)

(52) U.S. Cl.
CPC .......... *G06F 3/1204* (2013.01); *G06F 3/1231* (2013.01); *G06F 3/1257* (2013.01); *G06F 3/1288* (2013.01); *H04N 1/00244* (2013.01); *H04N 1/00411* (2013.01); *H04N 2201/0094* (2013.01)

(58) Field of Classification Search
CPC .......... H04N 1/00411; H04N 1/00244; H04N 2201/0094
USPC ....................................... 358/1.15, 1.14, 1.9
See application file for complete search history.

(56) References Cited

U.S. PATENT DOCUMENTS

| 8,726,370 B2 | 5/2014 | Minegishi |
| 2009/0217161 A1 | 8/2009 | Minegishi |
| 2014/0055800 A1* | 2/2014 | Matsumoto ........... G06F 3/1211 358/1.13 |
| 2015/0070725 A1* | 3/2015 | Monden ................ G06F 3/1232 358/1.15 |

FOREIGN PATENT DOCUMENTS

| JP | 2009-071819 | * 4/2009 |
| JP | 2010-204894 | 9/2010 |

* cited by examiner

*Primary Examiner* — Houshang Safaipour
(74) *Attorney, Agent, or Firm* — Harness, Dickey & Pierce, P.L.C.

(57) ABSTRACT

An information processing apparatus includes: an acquisition unit that acquires sets of apparatus type specifying information that specify types of apparatuses connected to the apparatus; an identifying unit that identifies the apparatus types of the connected apparatuses into a first apparatus type corresponding to a control program transmitted from a server and a second apparatus type different from the first apparatus type; and a specifying unit that, according to the sets of apparatus type specifying information on the apparatus types that are identified by the identifying unit and correspondence information that associates the sets of apparatus type specifying information with the types of user interface for accepting a setting relating to the process required to the apparatus, specifies a first type corresponding to the first apparatus type and a second type corresponding to the second apparatus type among the types of user interface.

16 Claims, 26 Drawing Sheets

| APPARATUS TYPE SPECIFYING INFORMATION | UI TYPE |
|---|---|
| PRINTER (A) | Type#A |
| PRINTER (B) | Type#B |
| PRINTER (E) | Type#A |
| PRINTER (F) | Type#X |

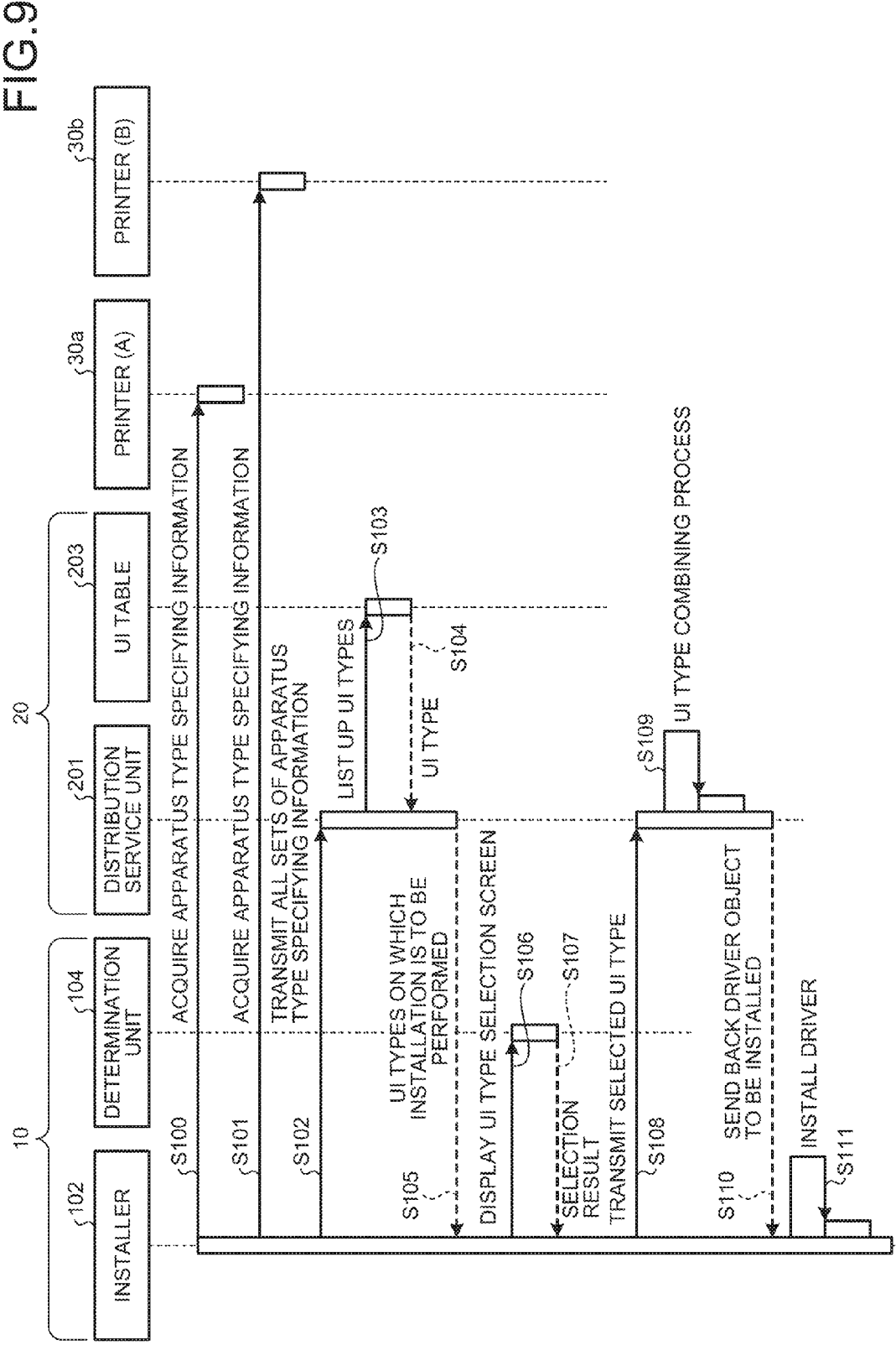

FIG.12

```
 1: {
 2:   "type" : "Screen::SubScreen",
 3:   "modules":
 4:   [
 5:     {
 6:       "type" : "Gui::ComboBox::Feature", "name" : "orientation",
 7:       "params" : {
            x":25, "y":22, "width":174
 8:       }
 9:     },
10:     {
11:       "type" : "Gui::ComboBox::Feature", "name" : "colorbw",
12:       "params" : {
            "x":228, "y":22, "width":174
13:       }
14:     },
15:     ...
16:   ]
17: }
```

FIG.13

```
1: <?xml version="1.0" encoding="utf-8"?>
2: <featuresettings version="1.0">
3:   <item category="feature" name="colorbw" default="color" type="pickone">
4:     <pickone name="color"/>
5:     <pickone name="blackandwhite"/>
6:   </item>
7:   <item category="feature" name="orientation" default="portrait" type="pickone">
8:     <pickone name="portrait"/>
9:     <pickone name="landscape"/>
10:  </item>
11: </featuresettings>
```

FIG.14

```
1: {
2:   "type" : "Screen::SubScreen",
3:   "modules":
4:   [
5:     {
6:       "type" : "Gui::ComboBox::Feature", "name" : "orientation",
7:       "params" : {
8:         "x":25, "y":22, "width":174
9:       }
10:    }, ...
11: }
```

FIG.16

| Type | Window Controll | Height (dot) | Width (dot) |
|---|---|---|---|
| pickone | Combobox | 30 | 174 |
| text | Textbox | 40 | 196 |

| APPARATUS TYPE SPECIFYING INFORMATION | UI VERSION |
|---|---|
| PRINTER (A) | Ver#2 |
| PRINTER (B) | Ver#1 |
| PRINTER (E) | Ver#2 |

INFORMATION PROCESSING APPARATUS, COMPUTER-READABLE RECORDING MEDIUM, AND INFORMATION PROCESSING SYSTEM

CROSS-REFERENCE TO RELATED APPLICATIONS

The present application claims priority to and incorporates by reference the entire contents of Japanese Patent Application No. 2015-058801 filed in Japan on Mar. 20, 2015.

BACKGROUND OF THE INVENTION

1. Field of the Invention

The present invention relates generally to an information processing apparatus, a computer-readable recording medium having a computer program for information processing, and an information processing system.

2. Description of the Related Art

As for a program, such as a printer driver, for controlling apparatuses that are connected to a computer and used, a technology of acquiring information from an apparatus to switch between display and non-display of a user interface (UI) for setting an optional function of the apparatus and of reading a setting file to change words that are used by the UI.

For example, Japanese Laid-open Patent Publication No. 2010-204894 discloses a technology of passing functional information containing language information from a printer to a printer driver and changing the text string displayed by the UI in accordance with the language environment of an operation system (OS). The technology according to Japanese Laid-open Patent Publication No. 2010-204894 makes enables display of a text string that is newly added in accordance with the function expansion of the printer, or a text string that is not prepared by the OS, in a correct language.

In the conventional technology, switching between display and non-display of the UI for setting an optional function of the apparatus and replacing words used by the UI in order to deal with a new setting are performed based on the original UI.

On the other hand, when a connected printer is replaced with another printer, for vender's convenience, UIs that are significantly different in the position at which the UI is displayed and in the method of displaying the UI may be used respectively for the printer driver corresponding to the printer to be replaced and the printer driver of the printer with which the printer is replaced. In such a case, there is a problem in that the user has to additionally learn operations on the UI after replacement, which is burdensome. This problem is not solved by the technology according to Japanese Laid-open Patent Publication No. 2010-204894.

In view of the above circumstances, there is a need to reduce the work of the user to operate the UI.

SUMMARY OF THE INVENTION

It is an object of the present invention to at least partially solve the problems in the conventional technology.

According to exemplary embodiments of the present invention, there is provided an information processing apparatus that is connectable to a plurality of apparatuses and to which a control program for issuing a request for a process to an apparatus corresponding to any one of the apparatuses is transmitted from a server, the information processing apparatus comprising: an acquisition unit that acquires sets of apparatus type specifying information that specify apparatus types of the connected apparatuses; an identifying unit that identifies the apparatus types of the connected apparatuses into a first apparatus type corresponding to the control program transmitted from the server and a second apparatus type different from the first apparatus type; and a specifying unit that, according to the sets of apparatus type specifying information on the apparatus types that are identified by the identifying unit and correspondence information that associates the sets of apparatus type specifying information with the types of user interface for accepting a setting relating to the process required to the apparatus, specifies a first type corresponding to the first apparatus type and a second type corresponding to the second apparatus type among the types of user interface.

Exemplary embodiments of the present invention also provide a non-transitory computer-readable recording medium that contains an information processing program for causing a computer included in an information processing apparatus which is connectable to a plurality of apparatuses and to which a control program for issuing a request for a process to an apparatus corresponding to any one of the apparatuses is transmitted from a server, to perform an information processing method comprising: acquiring sets of apparatus type specifying information that specify apparatus types of the connected apparatuses; identifying the apparatus types of the connected apparatuses into a first apparatus type corresponding to the control program transmitted from the server and a second apparatus type different from the first apparatus type; and according to the sets of apparatus type specifying information on the apparatus types that are identified by the identifying unit and correspondence information that associates the sets of apparatus type specifying information with the types of user interface for accepting a setting relating to the process required to the apparatus, specifying a first type corresponding to the first apparatus type and a second type corresponding to the second apparatus type among the types of user interface.

Exemplary embodiments of the present invention also provide an information processing system comprising: a storage unit that stores correspondence information that associates sets of apparatus type specifying information that specify apparatus types of apparatuses with types of user interface for accepting a setting relating to a process required to the apparatus; an acquisition unit that acquires the sets of apparatus type specifying information that specify a plurality of connected apparatuses; an identifying unit that identifies the apparatus types of the connected apparatuses into a first apparatus type corresponding to a control program for issuing a request for a process to an apparatus corresponding to any one of the apparatuses; and a specifying unit that, according to the sets of apparatus type specifying information on the apparatus types that are identified by the identifying unit and the correspondence information, specifies a first type corresponding to the first apparatus type and a second type corresponding to the second apparatus type among the types of user interface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is an exemplary sequence chart of sets of processing according to the first embodiment;

FIG. 12 is a diagram of exemplary UI layout information;

FIG. 13 is a diagram of exemplary function setting information;

FIG. 14 is a diagram of exemplary UI layout information containing only one part for displaying a combo box;

FIG. 16 is a diagram of exemplary default parameters;

FIG. 18 a table of an exemplary UI table according to the second embodiment;

DETAILED DESCRIPTION OF THE PREFERRED EMBODIMENTS

With reference to the accompanying drawings, embodiments of an information processing apparatus, a computer-readable recording medium having a computer program for information processing, and an information processing system will be described in detail below.

First Embodiment

Figure 1:
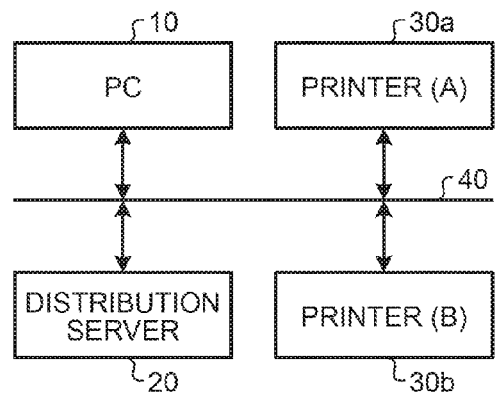
FIG. 1 is a block diagram of an exemplary configuration of an information processing system according to a first embodiment of the present invention.

FIG. 1 shows an exemplary configuration of an information processing apparatus according to a first embodiment of the present invention. As shown in FIG. 1, the information processing system includes a personal computer (PC) 10, a distribution server 20, and a plurality of printer apparatuses 30a and 30b that are communicably connected to one another via a network 40, such as a local area network (LAN). FIG. 1 shows the printer apparatuses 30a and 30b also as "PRINTER(A)" and "PRINTER(B)".

FIG. 1 shows the example where the information processing system includes the two printer apparatuses 30a and 30b; however, the embodiment is not limited to this. In other words, the information processing system according to the first embodiment may include three or more printer apparatuses and each printer apparatus may be a multifunction printer (MFP) having multiple functions, such as a printer function, a scanner function, a copy function, and a FAX function, that are incorporated in a single housing.

FIG. 1 shows that the information system includes the single PC 10 and the single distribution server 20; however, the embodiment is not limited to this. In other words, the information processing system according to the first embodiment may include a plurality of PCs 10, and the distribution server 20 is not necessarily configured by using a single information processing apparatus, i.e., the distribution server 20 may be configured by using multiple information processing apparatuses that are connected to one another. The network 40 is not necessarily a network depending on wired communications, i.e., the network 40 may be a network using wireless communications. The network 40 is not necessarily a LAN, i.e., the network 40 may be configured depending on wireless communications according to Bluetooth (trademark) or communications via a serial bus, such as a universal serial bus (USB).

As for the configuration shown in FIG. 1, when a driver program corresponding to, for example, the printer apparatus 30a is already installed in the PC 10, the PC 10 can transmit various setting instructions, such as a print instruction, to the printer apparatus 30a according to operations of a user on the PC 10. The printer apparatus 30a performs operations according to the instructions transmitted from the PC 10. Similarly, when a driver program corresponding to the printer apparatus 30b is already installed in the PC 10, the printer apparatus 30b performs printing and various setting operations according to instructions issued from the PC 10 according to operations of the user on the PC 10.

Alternatively, it is possible to install, in the PC 10, the driver program corresponding to the printer apparatus 30*a* and the driver program corresponding to the printer apparatus 30*b*. In this case, according to user operations, the PC 10 transmits instructions for printing and various types of setting to the selected one of the printer apparatuses 30*a* and 30*b*.

In response to, for example, a request from the PC 10, the distribution server 20 distributes the driver program corresponding to the printer apparatus 30*a* or the driver program corresponding to the printer apparatus 30*b*.

As for such a configuration, to install the driver program corresponding to the printer apparatus 30*b* in the PC 10, the PC 10 detects apparatus type specifying information that specifies the type of the apparatus from all apparatuses connected to the network 40 according to an installation instruction. The PC 10 acquires the detected apparatus type specifying information from each of the apparatuses and specifies the apparatus type specifying information corresponding to the apparatus type of the printer apparatus 30*b* whose corresponding driver program is required to be installed. The PC 10 then transmits the specified apparatus type specifying information to the distribution server 20.

The distribution server 20 previously stores driver programs respectively corresponding to various printer apparatuses in association with apparatus type specifying information. According to the apparatus type specifying information that is transmitted from the PC 10, the distribution server 20 transmits the driver program corresponding to the printer apparatus 30*b* to the PC 10. The PC 10 installs the driver program transmitted from the distribution server 20 in the PC 10 itself. This enables the use of the printer apparatus 30*b* via the PC 10.

According to the first embodiment, to install the driver program corresponding to the printer apparatus 30*a* in addition to the driver program corresponding to the printer apparatus 30*b* that is already installed, the PC 10 detects the apparatus type specifying information on all apparatuses on the network 40 and acquires the detected apparatus type specifying information. The PC 10 transmits the acquired apparatus type specifying information to the distribution server 20. The PC 10 adds identifying information for identifies the printer apparatus 30*a* whose corresponding driver program is required to be installed to the apparatus type specifying information corresponding to the printer apparatus 30*a* and transmits the apparatus type specifying information added with the identifying information to the distribution server 20.

On the other hand, the distribution server 20 previously stores a table that associates sets of apparatus type specifying information on the printer apparatuses 30*a* and 30*b* with the types (UI types) of user interfaces (UI) of the driver programs. The distribution server 20 refers to the table according to each set of apparatus type specifying information that is transmitted from the PC 10 and acquires the UI type associated with each set of apparatus type specifying information. The distribution server 20 transmits information representing the acquired UI type together with the apparatus type specifying information to the PC 10.

Accordingly, the PC 10 knows whether the UI of the driver program to be additionally installed is different from the UI of the driver program that is already installed.

Furthermore, when the UI of the driver program to be additionally installed and the UI of the driver program that is already installed are different form each other, the PC 10 can select whether to use the UI of the driver program to be additionally installed or the UI of the driver program that is already installed. The PC 10 transmits the result of selecting to the distribution server 20.

When the selecting result transmitted from the PC 10 represents that the UI of the driver program already installed is to be used, the distribution server 20 combines the driver program to be additionally installed and the UI of the driver program already installed and transmits the driver program and the UI that are combined to the PC 10. The PC 10 installs the driver program to which the UI of the driver program already installed is combined. Accordingly, the user can operate the driver program additionally installed in an operation environment common with the driver program already installed, which reduces the work of the user.

Figure 2:
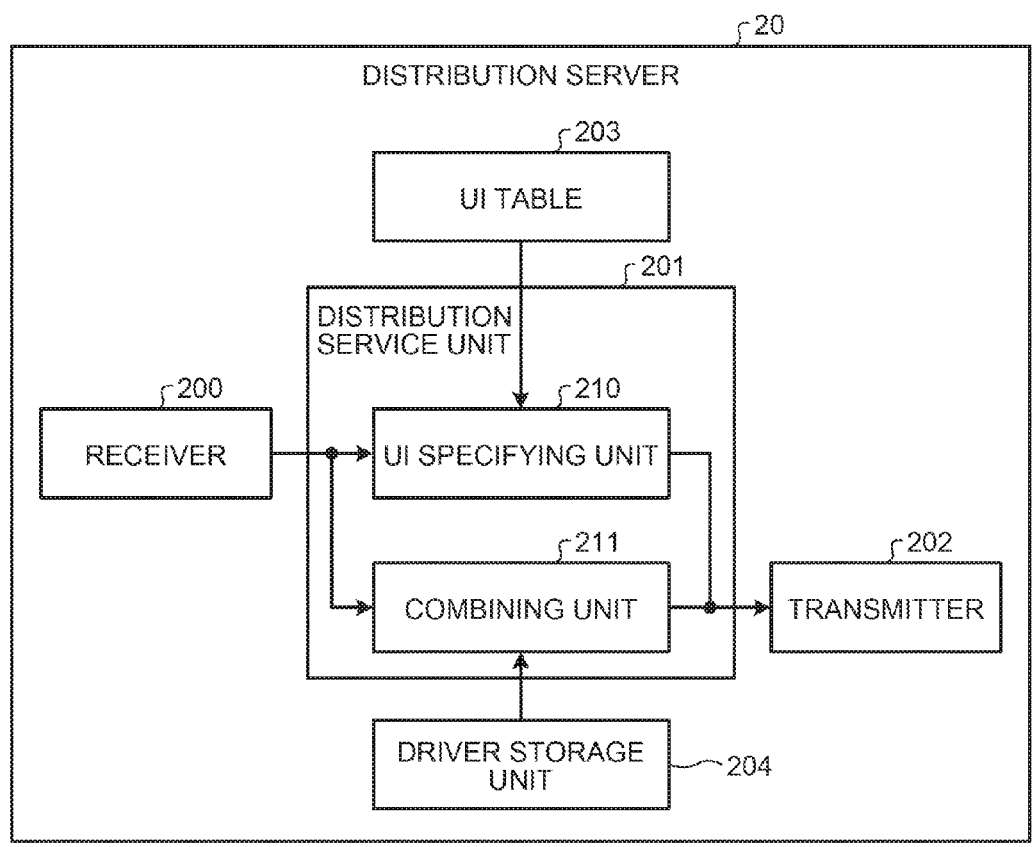
FIG. 2 is an exemplary functional block diagram for explaining functions of a distribution server according to the first embodiment.

FIG. 2 is an exemplary functional block diagram for explaining the functions of the distribution server 20 according to the first embodiment. According to FIG. 2, the distribution server 20 includes a receiver 200, a distribution service unit 201, a transmitter 202, a UI table 203, and a driver storage unit 204. The UI table 203 is stored in a storage, such as a hard disk drive or a non-volatile semiconductor memory. The driver storage unit 204 can use the storage.

The receiver 200, the distribution service unit 201, and the transmitter 202 can be configured by, for example, using a program that runs on the central processing unit (CPU). Alternatively, part of or all of the receiver 200, the distribution service unit 201 and the transmitter 202 can be configured by using hardware.

The receiver 200 receives data that is transmitted via the network 40. The distribution service unit 201 performs a process of distributing a driver program in accordance with a request that is transmitted via the network 40. The transmitter 202 transmits data to a specified address via the network 40.

The UI table 203 is a table (correspondence information) that associates sets of apparatus type specifying information that specifies the types of printer apparatuses and UI types. Here, a UI refers to a UI that can be used for a driver program for controlling a printer apparatus via the PC 10. The UI may differ depending on, for example, the type of printer apparatus or the version of driver program. The UI table 203 is updated according to the printer apparatus connected to the network 40 and a version up of the driver program.

When the operating system (OS) that runs on the PC 10 is Windows (trademark), a plug and play (PnP) name (PnP device ID) can be used as the apparatus type specifying information that specifies the apparatus types of the printer apparatuses 30*a* and 30*b*. A PnP name refers to apparatus type specifying information that is allocated to each type of apparatus. The apparatus type specifying information is not limited to PnP names as long as the apparatus type specifying information can uniquely identify the apparatus type of the printer apparatus. For example, the apparatus type names of printer apparatuses may be used as the apparatus type specifying information.

Figures 3, 4:
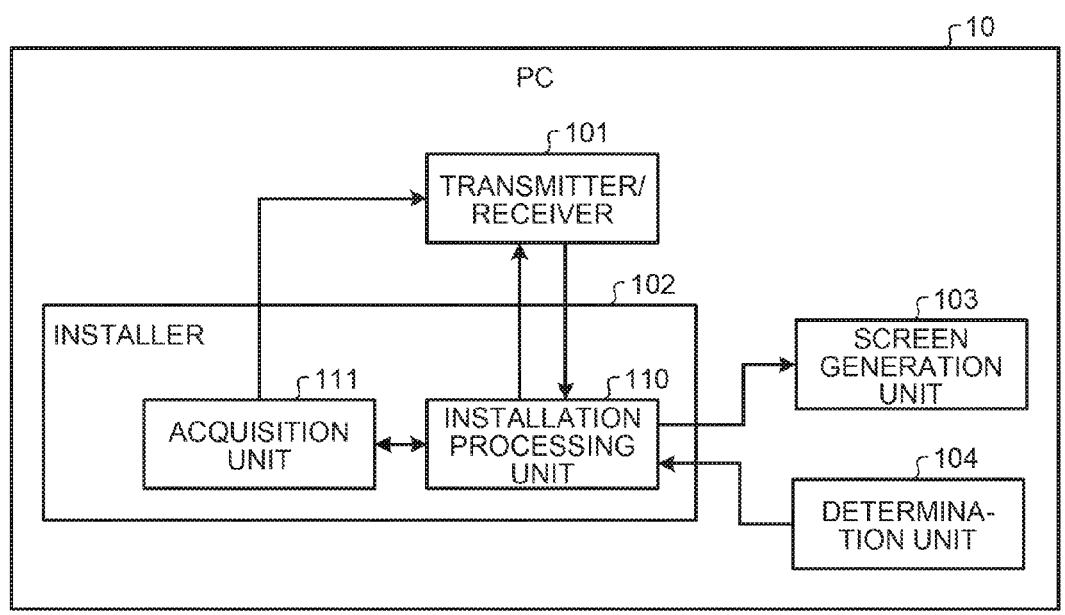
FIG. 3 is a table of an exemplary UI table that can be used for the first embodiment.
FIG. 4 is a functional block diagram for explaining functions of a PC according to the first embodiment.

FIG. 3 shows an example of the UI table 203 that can be used for the first embodiment. As shown in FIG. 3, the UI table 203 stores apparatus type specifying information and UI type in association with each other. As described above, the apparatus type names of printer apparatuses may be used as the apparatus type specifying information. According to the example shown in FIG. 3, a UI type of "Type#A" is associated with apparatus type specifying information of "PRINTER(A)". Similarly, a UI type of "Type#B" is associated with apparatus type specifying information of "PRINTER(B)", a UI type of "Type#A" is associated with apparatus type specifying information of "PRINTER(E)", and a UI type of "Type#X" is associated with apparatus type specifying information of "PRINTER(F)". As described above, multiple sets of apparatus type specifying information can be associated with one UI type.

The driver storage unit 204 stores driver programs corresponding to various apparatus types. A driver program refers to a program that is installed in an apparatus, such as a PC, connected to a printer apparatus and that is for controlling processes that are executed by the printer apparatus via the apparatus. The printer driver includes a driver main unit and a UI unit. The UI unit displays a screen for accepting a setting on a process executed by the printer apparatus from a user. The driver main unit has a function other than the UI unit of the driver program. The driver storage unit 204 stores, for example, each of the driver main unit and the UI unit in association with the apparatus type specifying information. Alternatively, the driver storage unit 204 may store a driver program obtained by previously combining the driver main unit and the UI unit that match in apparatus type.

The distribution service unit 201 includes a UI specifying unit 210 and a combining unit 211. The UI specifying unit 210 refers to the UI table 203 according to the apparatus type specifying information that is received by the receiver 200 and specifies the UI type that is associated with the apparatus type specifying information. The combining unit 211 acquires the UI unit and the driver main unit from the driver storage unit 204 and combines the UI unit and the driver unit, which are acquired, to generate a driver program. The combining unit 211 causes the transmitter 202 to transmit the generated driver program to a specified address.

FIG. 4 is a functional block diagram for explaining functions of the PC 10 according to the first embodiment. The PC 10 includes a transmitter/receiver 101, an installer 102, a screen generation unit 103, and a determination unit 104. The transmitter/receiver 101, the installer 102, the screen generation unit 103, and the determination unit 104 can be configured by using a program that runs on the CPU. Alternatively, part of or all of the transmitter/receiver 101, the installer 102, the screen generation unit 103, and the determination unit 104 may be configured by using hardware.

The transmitter/receiver 101 transmits/receives data via the network 40. The installer 102 performs a process of installing a driver program in the PC 10. The screen generation unit 103 generates screen information for displaying information on a display device, such as a liquid crystal display (LCD), according to an instruction from an installation processing unit 110, which will be described below. When there are multiple driver programs that are candidates to be installed in the PC 10, the determination unit 104 determines a driver program to be installed.

The installer 102 includes the installation processing unit 110 and an acquisition unit 111. The installation processing unit 110 controls the process of installing the driver program in the PC 10. Via the transmitter/receiver 101, the acquisition unit 111 communicates with the printer apparatuses 30a and 30b that are connected to the network 40, detects the apparatus type specifying information on the printer apparatuses 30a and 30b, and acquires the detected apparatus type specifying information.

Figure 5:
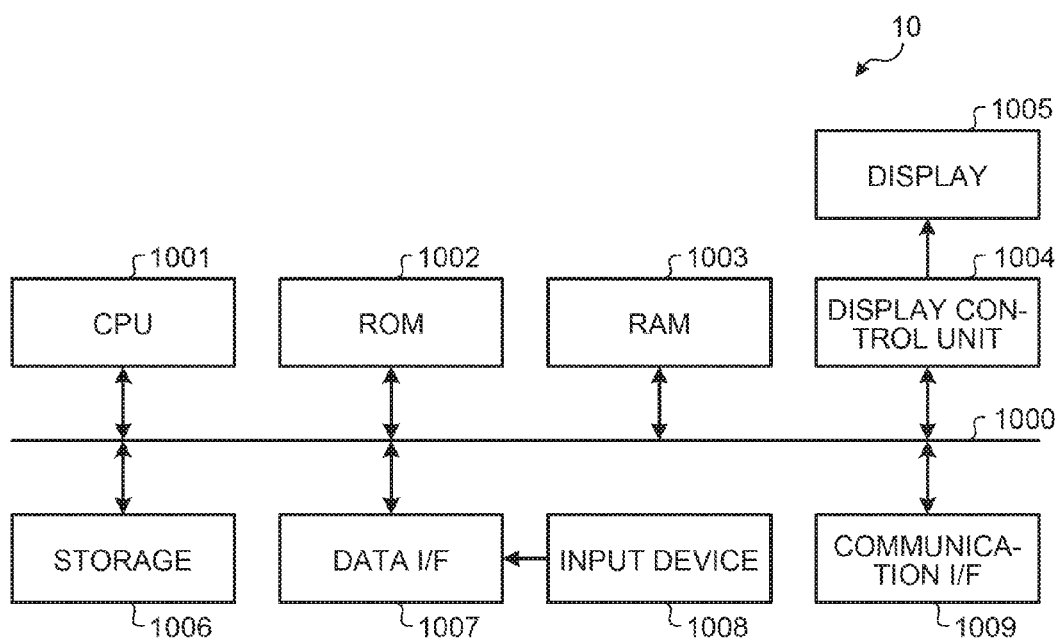
FIG. 5 is a block diagram of an exemplary hardware configuration of a PC that can be used for the first embodiment.

FIG. 5 shows an exemplary hardware configuration of the PC 10 that can be used for the first embodiment. The PC 10 includes a CPU 1001, a read only memory (ROM) 1002, a random access memory (RAM) 1003, a display control unit 1004, a storage 1006, a data I/F 1007, and a communication I/F 1009 that are all communicably connected via a bus 1000. The storage 1006 is a non-volatile semiconductor memory, such as a hard disk drive or a flash memory, that stores a program that runs on the CPU 1001 and various types of data.

According to the program that is read from the ROM 1002 or the storage 1006, the CPU 1001 controls whole operations of the PC 10 while using the RAM 1003 as a work memory. The display control unit 1004 to which a display 1005 including a display device depending on, for example, an LCD is connected causes the display 1005 to display a screen according to screen information that is supplied from the CPU 1001.

The data I/F 1007 controls input/output of data from/to an external apparatus. For the data I/F 1007, for example, a universal serial bus (USB) can be used. Alternatively, an interface using wireless communications according to, for example, Bluetooth (trademark) may be used for the data I/F 1007. According to the example shown in FIG. 5, an input device 1008 that accepts a user input is connected to the data I/F 1007. The input device 1008 includes a pointing device, such as a mouse or a touch pad, and a character input device, such as a keyboard.

The communication I/F 1009 controls communications via the network 40 according to an instruction from the CPU 1001.

The transmitter/receiver 101, the installer 102, the screen generation unit 103, and the determination unit 104 are implemented by using the program that runs on the CPU 1001. The program is stored in a computer (such as the distribution server 20) that is connected to the network 40 to which the communication I/F 1009 is connected and the program is configured to be downloaded by the PC 10 via the network 40 and thus provided. Alternatively, the program may be configured to be provided or distributed via the network 40.

Alternatively, the program may be recorded in a computer-readable recording medium, such as a compact disk (CD) or a digital versatile disk (DVD), in a file in an installable or an executable form and thus provided. In this case, for example, the program is provided to the PC 10 via, for example, an external driver device, or a computer, connected to the data I/F 1007. Alternatively, the program may be previously stored in the ROM 1002 or the storage 1006 and thus provided.

The program has a module configuration including the above-describe various units (the transmitter/receiver 101, the installer 102, the screen generation unit 103, and the determination unit 104). As for practical hardware, the CPU 1001 reads the program from, for example, the storage 1006 and executes the program so that the various units are loaded into a main storage device (such as the RAM 1003) and the units are generated in the main storage device.

Figure 6:
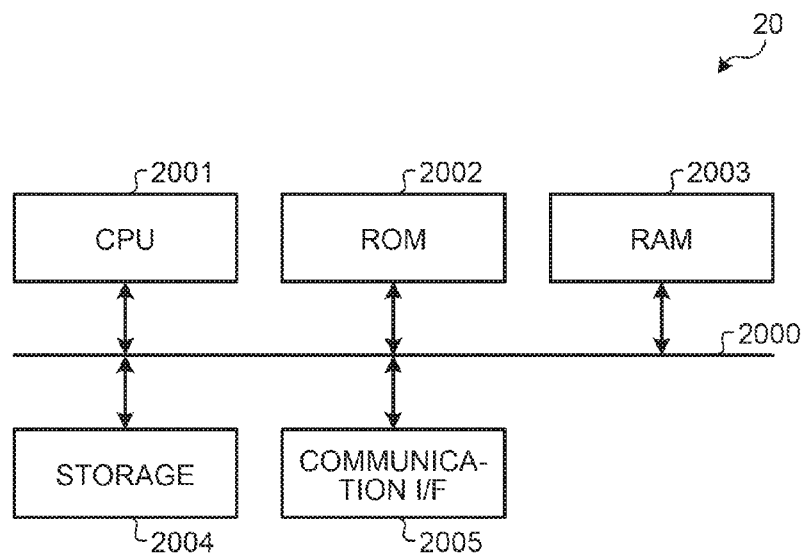
FIG. 6 is a block diagram of an exemplary hardware configuration of a distribution server that can be used for the first embodiment.

FIG. 6 shows an exemplary hardware configuration of a distribution server 20 that can be used for the first embodiment. The distribution server 20 can be configured by using a general-purpose computer apparatus, and elements relating to user operations, such as an input device and a display, may be omitted. For example, according to the example shown in FIG. 6, compared to the configuration of the PC 10 shown in FIG. 5, the display control unit 1004 and the data I/F 1007 are omitted from the configuration of distribution server 20.

The distribution server 20 shown in FIG. 6 includes a CPU 2001, a ROM 2002, a RAM 2003, a storage 2004, and a communication I/F 2005 that are all connected to be externally communicable via a bus 2000.

The storage 2004 is a non-volatile semiconductor memory, such as a hard disk drive or a flash memory, that stores a program that runs on the CPU 2001 and various types of data including the UI table 203 and the driver main unit and the UI unit that are stored in the driver storage unit 204.

According to the program that is read from the ROM 2002 or the storage 2004, the CPU 2001 controls whole operations of the distribution server 20 while using the RAM 2003 as a work memory. The communication I/F 2005 controls communications via the network 40 according to an instruction from the CPU 2001.

The configuration of the distribution server 20 is not limited to the example shown in FIG. 6. Similarly to, for example, the case of the PC 10 shown in FIG. 5, the distribution server 20 may further include a display control unit that causes a display to display a screen according to screen information that is generated by the CPU 2001 on the display, a data I/F that inputs/outputs data from/to an external apparatus, and an input device that accepts a user input.

The receiver 200, the distribution service unit 201, and the transmitter 202 run on the CPU 2001. The program is stored in a computer that is connected to the network 40 to which the communication I/F 2005 is connected and the program is configured to be downloaded by the distribution server 20 via the network 40 and thus provided. Alternatively, the program may be configured to be provided or distributed via the network 40.

Alternatively, the program may be provided in a non-transitory computer-readable recording medium, such as a compact disk (CD) or a digital versatile disk (DVD), in a file in an installable or an executable form and thus provided. In this case, for example, the distribution server 20 may be provided with a data I/F to supply the program to the distribution server 20 via an external driver device, or an external computer, that is connected to the data I/F. Similarly to the program, the UI table 203 and each of the driver main units and the UIs that are stored in the driver storage unit 204 may be provided to the distribution server 20 via the network 40, or a computer-readable recording medium, such as a CD or a DVD.

The program has a module configuration including the above-describe various units (the receiver 200, the distribution service unit 201, and the transmitter 202). As for practical hardware, the CPU 2001 reads the program from the storage 2004 and executes the program so that the various units are loaded into a main storage device (such as the RAM 2003) and the units are generated in the main storage device.

Details of Process According to First Embodiment

Figure 7:
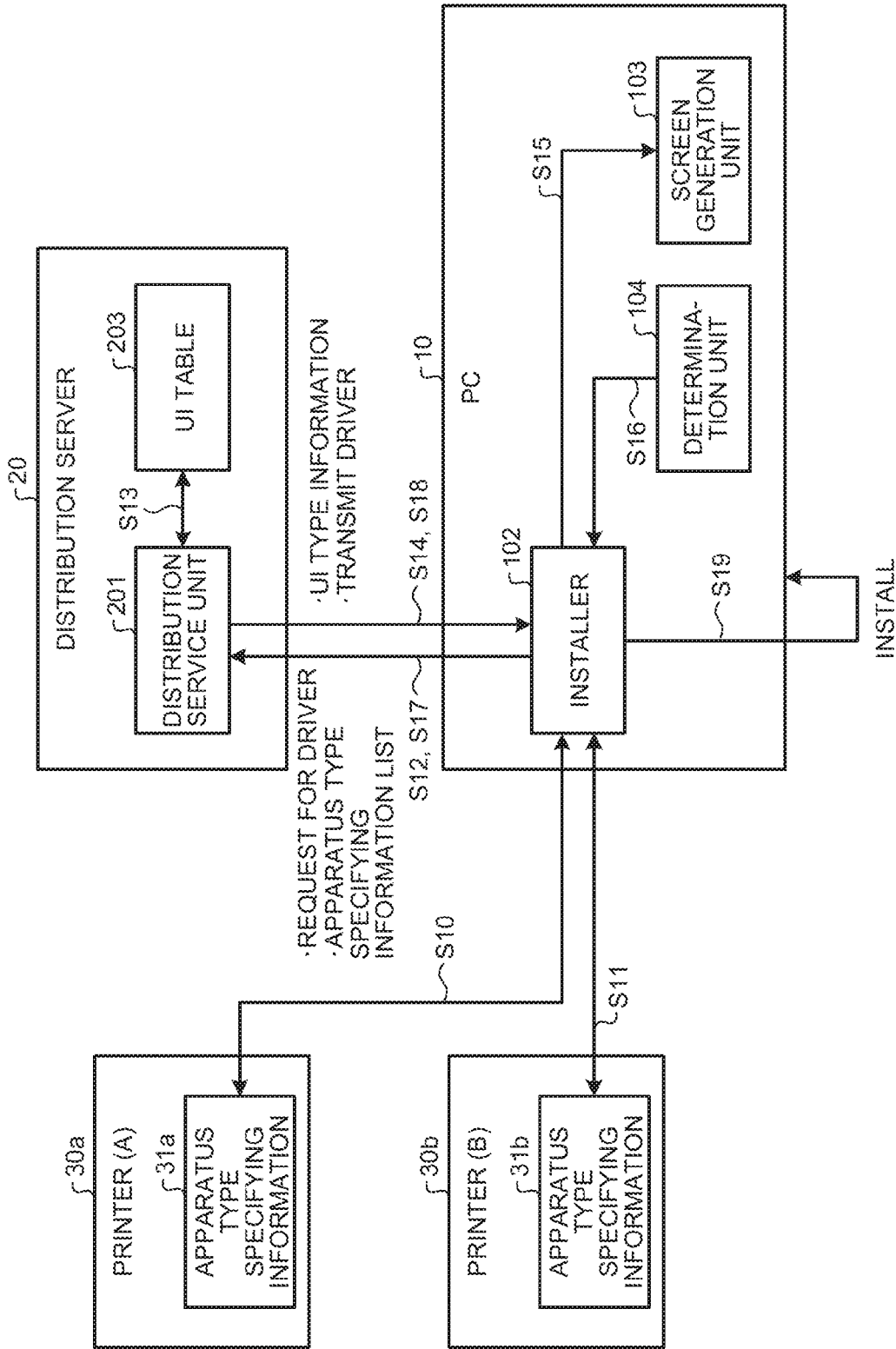
FIG. 7 is a diagram of a flow of an installation process according to the first embodiment.

The installation process of installing a driver program in the PC 10 according to the first embodiment will be described more in detail below. FIG. 7 shows the flow of the installation process according to the first embodiment. Components shown in FIG. 7 that are common with FIGS. 1, 2 and 4 are denoted with the same reference numerals as those shown in FIGS. 1, 2 and 4 to omit detailed descriptions of the components. The function units of the PC 10 and the distribution server 20 shown in FIG. 7 represent components closely tied to the installation process and other components are omitted.

It is assumed that the printer apparatus 30b shown in FIG. 7 is an already-installed printer apparatus whose corresponding driver program is already installed in the PC 10. Furthermore, it is assumed that the printer apparatus 30a is a printer apparatus that is to be additionally introduced after the printer apparatus 30b, i.e., the driver program corresponding to the printer apparatus 30a is not installed in the PC 10 yet.

An exemplary process of additionally installing the driver program corresponding to the printer apparatus 30a in the PC 10 in such a situation will be described below. For example, in response to a user operation on the PC 10, the installer 102 in the PC 10 is started so that the process of installing the driver program corresponding to the printer apparatus 30a is started.

When an instruction of installing the driver program corresponding to the printer apparatus 30a is issued in response to, for example, a user operation, the installer 102 detects the apparatus type specifying information from the various apparatuses on the network 40 and acquires the detected apparatus type specifying information. According to the example shown in FIG. 7, the installer 102 detects sets of apparatus type specifying information 31a and 31b from the printer apparatuses 30a and 30b on the network 40 and acquires the detected sets of apparatus type specifying information 31a and 31b (step S10 and step S11). The sets of apparatus type specifying information 31a and 31b are previously stored in recording media, such as registers or memories, of the printer apparatuses 30a and 30b.

The installer 102 transmits an apparatus type specifying information list including the sets of apparatus type specifying information 31a and 31b to the distribution server 20 (step S12). At step S12, the installer 102 identifiably transmits, to the distribution server 20, the apparatus type specifying information 31a on the printer apparatus 30a corresponding to the driver program to be installed and the apparatus type specifying information 31b on the printer apparatus 30b whose corresponding driver program is already installed in the PC 10. For example, the installer 102 adds identifying information representing the driver program is to be installed to the sets of apparatus type specifying information 31a and 31b and transmits the sets of apparatus type specifying information 31a and 31b added with the identifying information. As described above, the installer 102 functions also as an identifying unit that identifies the apparatus types represented by the sets of apparatus type specifying information 31a and 31b and determines whether the process is to be performed on the apparatus types.

The apparatus type specifying information list and the identifying information that are transmitted from the PC 10 are received by the distribution server 20 and passed to the distribution service unit 201. The distribution service unit 201 refers to the UI table 203 according to the received apparatus type specifying information list and acquires the UI types associated respectively with the sets of apparatus type specifying information 31a and 31b that are contained in the apparatus type specifying information list (step S13).

The distribution service unit 201 acquires the UI type associated with the apparatus type specifying information 31a on the printer apparatus 30a whose corresponding driver program is required to be installed in the PC 10. At the same time, the distribution service unit 201 acquires, from the various UI types stored in the UI table 203, a UI type different from the UI type associated with the apparatus type specifying information 31a from among the UI types associated with the apparatus type specifying information contained in the apparatus type specifying information list that is transmitted from the PC 10.

According to the example shown in FIG. 3, the UI type of "Type#A" is associated with the apparatus type specifying information 31a (PRINTER(A)) on the printer apparatus 30a. Furthermore, the UI type of "Type#B" is associated with the apparatus type specifying information 31b (PRINTER(B)) on the printer apparatus 30b. This represents that the UI type associated with the already-installed printer apparatus 30b is different from the UI type associated with the printer apparatus 30a whose driver program is required to be installed in the PC 10.

Accordingly, the distribution service unit 201 transmits, to the PC 10, the fact that the UI type corresponding to the printer apparatus 30a to be additionally introduced is "Type#A" and the UI type corresponding to the already-installed printer apparatus 30b is "Type#B" (step S14). At step S14, the distribution service unit 201 transmits, to the PC 10, the UI types "Type#A" and "Type#B" in association with the apparatus type specifying information 31a and the apparatus type specifying information 31b, respectively.

The UI table 203 shown in FIG. 3 stores the UI type of "Type#X" as a UI type different from the UI type associated with the printer apparatus 30b. The apparatus type specifying information list transmitted from the PC 10 does not contain the apparatus type specifying information (PRINTER(F)) associated with the UI type of "Type#X". Accordingly, the distribution service unit 201 excludes the UI type of "Type#X" from UI types to be transmitted to the PC 10.

The UI types of "Type#A" and "Type#B" that are transmitted from the distribution service unit 201 are received by the PC 10 and passed to the installer 102. The installer 102 passes each of the UI types of "Type#A" and "Type#B" received by the PC 10 to the screen generation unit 103 (step S15). According to the passed UI types of "Type#A" and "Type#B", the screen generation unit 103 generates screen information on a selection screen on which a UI type to be used for the driver program to be installed is selected. The screen generation unit 103 displays the selection screen according to the generated screen information on the display 1005 via the display control unit 1004.

Figure 8:
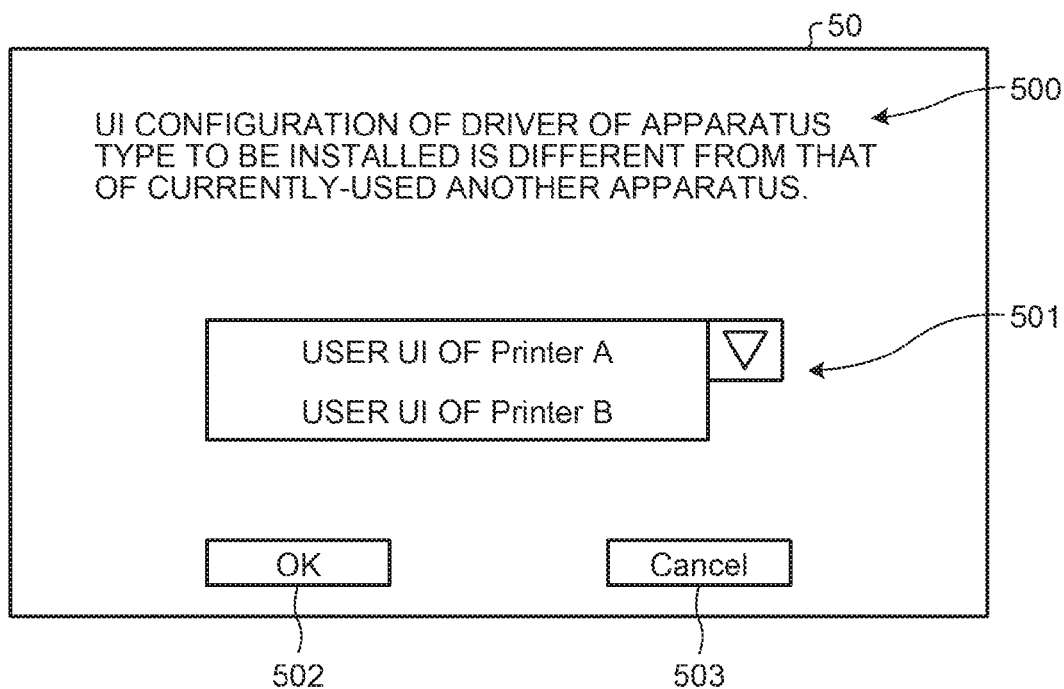
FIG. 8 is a diagram of an exemplary selection screen that can be used for the first embodiment.

FIG. 8 shows an example of the selection screen generated by the screen generation unit 103 that can be used for the first embodiment. According to FIG. 8, a selection screen 50 includes a message display area 500, a selection input section 501, and buttons 502 and 503.

A message that is represented by the installer 102 to the user is displayed on the message display area 500. In this example, the UI type to be used differs between the driver program corresponding to the already-introduced printer apparatus 30b and the driver program corresponding to the printer apparatus 30a to be additionally introduced. For this reason, as shown in FIG. 8, the screen generation unit 103 displays the message notifying the user of the fact on the message display area 500.

The selection input section 501 accepts a user input for selecting a UI to be used for the driver program to be installed. According to the example shown in FIG. 8, the selection input section 501 displays an item of "Printer B" representing the already-introduced printer apparatus 30b and an item of "Printer A" representing the printer apparatus 30a to be additionally introduced.

According to the example shown in FIG. 8, the selection input section 501 is configured by using a so-called combo box; however, the embodiment is not limited to this example. Alternatively, the selection input section 501 may be configured by using a so-called radio button. The default state of the selection input section 501 may be a state where the UI corresponding to the printer apparatus 30a to be additionally introduced is selected.

The button 502 is a button for determining selection according to a user input made on the selection input section 501. The button 503 is a cancel button. For example, by operating the button 503, the process of installing the driver program corresponding to the printer apparatus 30a to be additionally installed can be stopped.

The determination unit 104 acquires the user input made on the selection screen 50 and, according to the acquired user input, determines a UI type to be used for the driver program to be installed. The determination unit 104 passes information representing the determined UI type to the installer 102 (step S16). In order to prevent complexity, the "information representing the UI type" is referred to as the "UI type" in the descriptions below, unless otherwise denoted.

In other words, when the button 502 is operated on the selection screen 50, the determination unit 104 determines a UI type corresponding to an item in a selected state from among the items of "Printer A" and "Printer B" as a UI type to be used for the driver program to be installed on the selection input section 501 and passes the UI type passed from the determination unit 104 to the installer 102. The installer 102 transmits the UI type passed from the determination unit 104 to the distribution server 20 and issues a request for a driver (step S17).

The distribution server 20 receives the UI type transmitted from the installer 102 and passes the UI type to the distribution service unit 201. The distribution service unit 201 generates a driver program based on the passed UI type and the apparatus type specifying information 31a on the printer apparatus 30a whose corresponding driver program is required to be installed in the PC 10, which is the apparatus type specifying information 31a received from the installer 102 at step S12.

The generated driver program is transmitted from the distribution server 20 to the PC 10 (step S18). The PC 10 receives the driver program transmitted from the distribution server 20 and passes the driver program to the installer 102. The installer 102 installs the passed driver program in the PC 10 (step S19).

The above-described process from step S16 will be described more specifically below. As a first example, a case will be described where the UI type of the driver program corresponding to the printer apparatus 30a to be additionally introduced matches the UI type that is selected by using the selection screen 50. For example, it is assumed that, for the printer apparatus 30a to be additionally introduced, the item of "Printer A" is selected on the selection screen 50.

The UI type of "Type#A" corresponding to the item of "Printer A" is passed from the determination unit 104 to the installer 102. The installer 102 transmits the UI type of "Type#A" to the distribution server 20 and issues a request for a driver program to the distribution server 20 (step S17). The distribution server 20 passes the received request for a driver program to the distribution service unit 201.

According to the passed request for a driver program, the distribution service unit 201 fetches the UI unit corresponding to the UI type of "Type#A" from the driver storage unit 204. The distribution service unit 201 further fetches, from the driver storage unit 204, the driver main unit corresponding to the apparatus type specifying information 31a on the printer apparatus 30a whose corresponding driver program is required to be installed in the PC 10. The driver main unit and the UI unit that are fetched by the distribution service unit 201 are combined by the combining unit 211 into one driver program and the driver program is transmitted to the PC 10 (step S18).

As a second example, a case will be described where the UI type of the driver program corresponding to the printer apparatus 30a to be newly introduced and the UI type that is selected by the selection screen 50 differ from each other. For example, it is assumed that, for the printer apparatus 30a to be additionally introduced, the item of "Printer B" representing the printer apparatus 30b is selected on the selection screen 50.

The installer 102 transmits the item of "Type#B" passed from the determination unit 104 corresponding to the item of "Printer B" to the distribution server 20 and issues a request for a driver program to the distribution server 20 (step S17). The distribution server 20 passes the received request for a driver program to the distribution service unit 201.

According to the passed request for a driver program, the distribution service unit 201 fetches, from the driver storage unit 204, the UI unit corresponding to the UI type of "Type#B" and the driver main unit corresponding to the apparatus type specifying information 31a on the printer apparatus 30a whose corresponding driver program is required to be installed in the PC 10. The combining unit 211 generates combines the driver main unit and the UI unit, which are fetched, to generate a driver program.

In this case, the corresponding apparatus type differs between the UI unit and the driver main unit. For this reason, the driver program generated by the combining unit 211 is obtained by, for the driver main unit corresponding to the printer apparatus 30a whose corresponding driver program is required to be installed in the PC 10, replacing the UI unit with the UI unit of the already-introduced printer apparatus 30b. In other words, the UI type of the generated driver program is the UI type of the driver program of the printer apparatus 30b and the driver main unit corresponds to the printer apparatus 30a. The distribution service unit 201 transmits the driver program generated by the combining to the PC 10 (step S18).

As described above, according to the first embodiment, the UI of the driver program for the already-introduced printer apparatus 30b can be used for the UI of the driver program for the printer apparatus 30a to be additionally introduced. This allows the user to perform an operation on the driver program corresponding to the printer apparatus 30a to be additionally introduced in the same manner as the user performs an operation on the driver program corresponding to the already-introduced printer apparatus 30b, which reduces the work of the user.

FIG. 9 is an exemplary sequence chart of the sets of processing according to the first embodiment. The components shown in FIG. 9 common with FIGS. 1, 2, 4 and 7 are denoted with the same reference numerals as those shown in FIGS. 1, 2, 4 and 7 to omit detailed descriptions of the components. For example, the installer 102 in the PC 10 is started and an instruction for installing a driver program corresponding to a specific apparatus (printer apparatus) is issued, so that the process according to the sequence shown in FIG. 9 is started.

When an instruction for installing a driver program is issued, the installer 102 detects the apparatus type specifying information from each apparatus on the network 40 and acquires the detected apparatus type specifying information (steps S100 and S101). In this example, the installer 102 acquires the sets of apparatus type specifying information 31a and 31b from the printer apparatuses 30a and 30b. The installer 102 identifiably transmits, to the distribution server 20, the acquired apparatus type specifying information on all of the apparatuses, i.e., the apparatus type specifying information on an apparatus whose corresponding driver program is required to be installed in the PC 10, and the apparatus type specifying information on an apparatus whose corresponding driver program is not to be installed but that is connected to the PC 10 via the network 40. The distribution server 20 passes the received apparatus type specifying information to the distribution service unit 201 (step S102).

In the distribution service unit 201, the UI specifying unit 210 refers to the UI table 203 according to the passed apparatus type specifying information and searches for the UI types that are associated respectively with the sets of apparatus type specifying information (step S103). At step S103, the UI specifying unit 210 lists up UI types different from the UI type associated with the apparatus type specifying information on the apparatus whose corresponding driver program is required to be installed in the PC 10 (step S104). The distribution service unit 201 transmits the list of the acquired UI types to the installer 102 (step S105).

The installer 102 passes the passed UI type list to the screen generation unit 103. The installer 102 then generates the selection screen 50 for selecting a UI type to be used for the UI of the driver program to be installed from among the UI types contained in the UI type list (step S106). The determination unit 104 sends, as a response, the UI type selected according to a user operation on the selection screen 50 to the installer 102 as the selection result (step S107).

The installer 102 transmits the UI type shown by the selection result sent as a response from the determination unit 104 to the distribution server 20. The distribution server 20 passes the received UI type to the distribution service unit 201 (step S108). In the distribution service unit 201, the combining unit 211 fetches, from the driver storage unit 204, the UI unit corresponding to the passed UI type and the driver main unit of the driver program corresponding to the apparatus required to be installed in the PC 10 and combines the UI unit and the driver main unit that are fetched to generate one driver program (step S109).

The distribution service unit 201 transmits the driver program generated by the combining unit 211 to the PC 10. The PC 10 passes the received driver object to the installer 102 (step S110). The installer 102 then installs the passed driver program in the PC 10 (step S111).

Process of Replacing UI UNIT

Figure 10A:
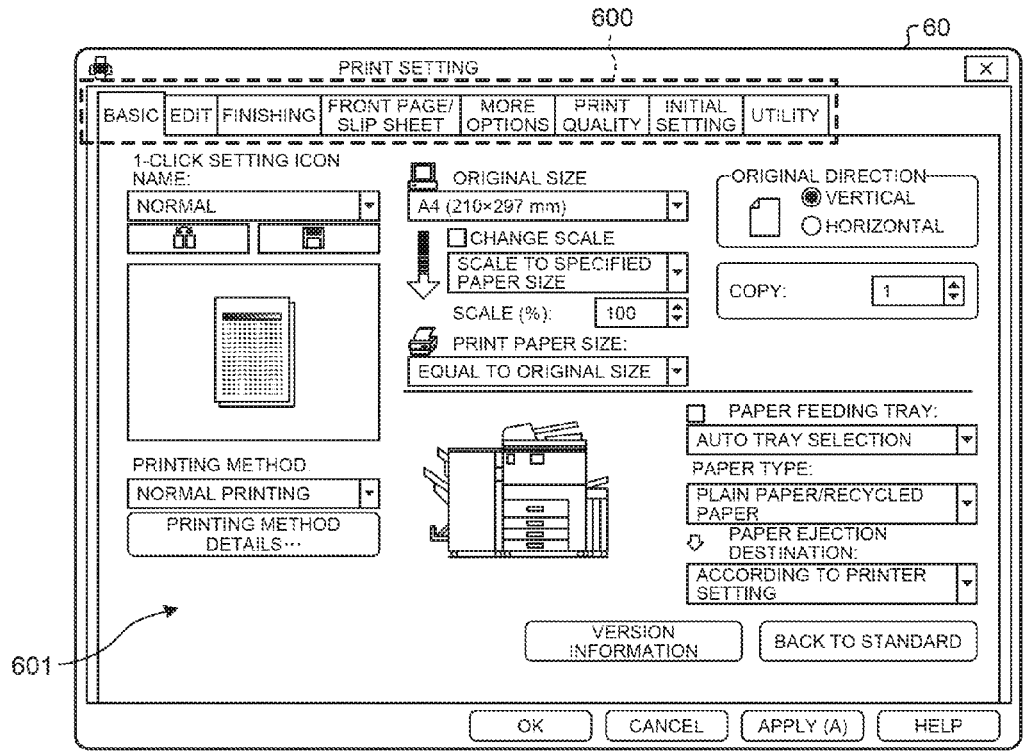
FIGS. 10A and 10B are diagrams of exemplary UIs of different UI types.
Figure 10B:
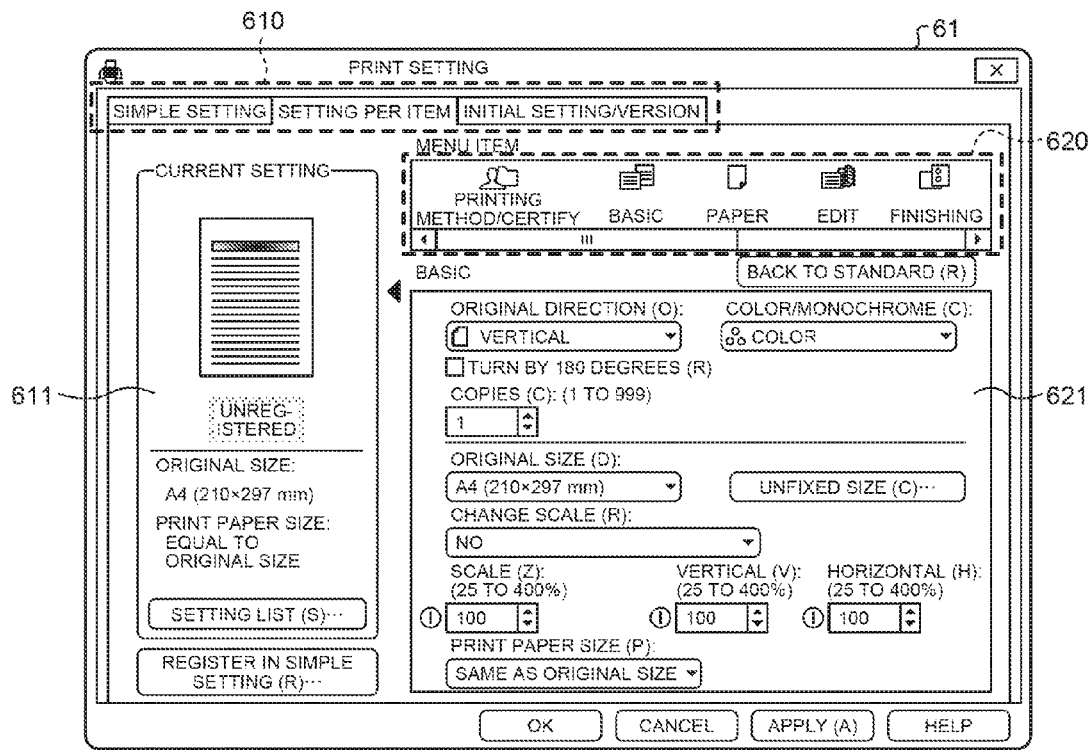

A process of replacing a UI unit performed by the combining unit 211 will be described here. FIGS. 10A and 10B show exemplary UIs of different UI types. According to FIG. 10A, a UI screen 60 includes a tab unit 600 including multiple tabs and a setting area 601 including multiple input areas. Specifying a desired tab from among the multiple tabs provided to the tab unit 600 on the UI screen 60, the UI screen 60 allows switching the content of the setting area 601 to the content corresponding to the specified tab.

On the other hand, according to FIG. 10B, a UI screen 61 includes a tab unit 610 including multiple tabs and a tab screen area 611. The tab screen area 611 further includes a sub-tab unit 620 including multiple tabs and a setting area 621. By specifying a desired tab from among the multiple tabs provided to the tab unit 610, the content of the multiple tabs provided to the sub-tab unit 602 can be switched to the content corresponding to the specified tab. By specifying a desired tab from among the multiple tabs provided to the tab part 610, the content of the setting area 621 can be switched to the content corresponding to the specified tab.

On the UI screen 61, the tabs of the tab unit 600 on the UI screen 60 and the content of various setting areas 601 corresponding to the respective tabs, so the setting items are selectable in stages. In other words, the UI screen 60 and the UI screen 61 present common setting items to the user by using different UI types.

For example, a case will be assumed where the driver program corresponding to the already-introduced printer apparatus 30b has the UI screen 60 shown in FIG. 10A and the driver program corresponding to the printer apparatus 30a to be additionally introduced has the UI screen 61 shown in FIG. 10B. In this case, when the user uses the printer apparatus 30a via the PC 10, it is necessary to additionally obtain a method of operating the UI screen 61 different in configuration from the existing UI screen 60, which may be burdensome.

Various elements constituting the UI, such as the tabs, the tab unit that is an assembly of tabs, each input area, and the message display area, are referred to as the "UI parts" or simply as "parts".

Figure 11:
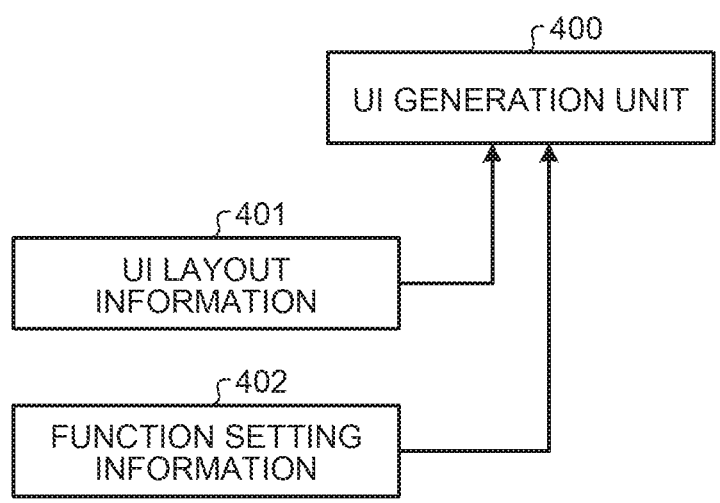
FIG. 11 is a diagram of an exemplary configuration of a UI unit.

FIG. 11 is an exemplary configuration of the UI unit. The UI unit includes a UI generation unit 400, UI layout information 401, and function setting information 402. The UI layout information 401 contains various setting values relating to the screen display of the UI part. The function setting information 402 contains various setting values that are set by the respective UI parts in the driver main unit. The UI generation unit 400 is a program that runs on the CPU 2001 of the distribution server 20 and, by reading the UI layout information 401 and the function setting information 402, the UI generation unit 400 generates a UI according to the setting values contained in each set of information.

FIG. 12 shows an example of the UI layout information 401. Unless otherwise denoted, the top number of each row represents the row number for explanation and the following semi-colon of (:) distinguishes the number and the code representing the main data. The code exemplified in FIG. 12 is a pseudocode imitating the method of describing C language that is generally used as a programming language.

As shown in FIG. 12, the first row represents that the UI layout information 401 is described between the bracket of "{" in the first row and the bracket "}" corresponding to the bracket "{" in the seventeenth row. Information for defining the parts displayed on the UI screen is described in the section between the bracket "[" in the fourth row that is indented by one space with respect to the brackets in the first and seventeenth rows and the bracket "]" in the 16th row corresponding to the bracket "[".

Furthermore, parts information that defines the UI parts is described in the section between the set of the bracket "{" indented by one space with respect to the brackets in the fourth row and the 16th row and the bracket "}" corresponding to the bracket "{". According to the example shown in FIG. 12, a set of parts information is described in each of the section between the fifth row and the ninth row and the section between the 10th row and the 14th row. The items for defining the parts information are described with "," (comma) that sections the items.

The items of "type", "name" and "params" are described in the section between the fifth row and the ninth row. The item of "type" represents the type of part on whether the part is a combo box or a radio button. The item of "name" represents the name for association with the item of the function setting information 402, which will be described below. The item of "params" represents the set of coordinates (x, y) and the size (width) at and in which the part is disposed. The set of coordinates (x, y) represents the set of coordinates of the origin of the part. For example, the origin is a set of coordinates on the upper left corner of the part that is defined by a rectangle, the x-coordinate increases rightward and the y coordinate increases downward. This example represents that the part represented in the section between the fifth row and the ninth row is a part where the type is "ComboBox", the name is "orientation", the set of coordinates of (x,y) is "25,22", and the width is 174.

Similarly, it is represented that the part represented between the 10th and 14th rows is a part where the type is "ComboBox", the name is "colorbw", the set of coordinates of (x, y) is "228,22", and the width is 174.

FIG. 13 shows an example of the function setting information 402. The code exemplified in FIG. 13 is described by using extensible markup language (XML) that is one of markup languages that define and describe the meaning and structure of data by using tags. The first row in FIG. 13 represents that the data is described by using XML. The second row represents the version information of the data.

The tag of "item" is described in the section between the third and sixth rows that are indented by one space with respect to the second row to define one function. Similarly, one function is defined in the section between the seventh and 10th rows.

According to the description in the third to sixth rows, the third row contains the items of "category", "name", "default" and "type". The item of "name" represents a name defining a function, and the item of "name" may be used also as a key for association with the item of "name" of the UI layout information 401 described above with reference to FIG. 12. The item of "default" represents a default value. The item of "type" represents the type of input, such as an input selected from choices or a free input. For example, the value of the item of "type" is "pickone" in the case of an input selected from choices, or is "text" in the case of a free input.

When the value of the item of "type" is "pickone" and an input selected from choices is specified, indentation by one space is performed from the next row to specifically define the choices. According to the example shown in FIG. 13, in the fourth and fifth rows, each of the value of "color" and the value of "blackandwhite" is shown as the item of "pickone name". Accordingly, it is represented that there are two choices of "color" and "blackandwhite" for the input represented by the value of pickone" in the item of "type" in the third row.

Similarly to the third to sixth rows, the seventh to 10th rows represent the definition of function.

The UI generation unit 400 associates the value of the item of "name" contained in the UI layout information 401 and the value of the item of "name" contained in the function setting information 402 with each other, generates a UI part according to the sets of coordinates contained in the UI layout information 401, and configures a UI screen. Such a system allows a change only in the UI screen without changing the function setting item.

The process of combining the driver main unit of the driver program to be additionally installed and the UI unit of the already-introduced driver program will be described here. It is assumed that, on the selection screen 50 shown in FIG. 8, the UI screen of the already-introduced driver program is specified as one used for the UI screen of the driver program to be additionally introduced. Depending on the specifying, the process of replacing the first UI unit of the driver program to be additionally introduced with the second UI unit of the already-introduced driver program. In this case, the first UI unit may be provided with a part not existing in the second UI unit.

It is assumed that the second UI unit is assumed to have the UI layout information 401. The UI layout information

401 illustrated in FIG. 14 contains only the part for displaying a combo box. On the other hand, it is assumed that the first UI unit has the function setting information 402 that defines the two functions. In this case, the UI layout information 401 shown in FIG. 14 and the function setting information 402 shown in FIG. 13 are combined.

While the function setting information 402 shown in FIG. 13 defines the two functions, the UI layout information 401 shown in FIG. 14 contains only one part. For this reason, according to the UI layout information 401, the part of one of the two functions in the function setting information 402 shown in FIG. 13 cannot be displayed on the UI screen. According to the example shown in FIGS. 13 and 14, there is no definition of the UI layout information 401 shown in FIG. 14 for the function represented by "name="colorbw"" that is contained in the function setting information 402 shown in FIG. 13. Thus, according to the UI layout information shown in FIG. 14, the part relating to the function represented by "name="colorbw"" is not displayed.

The UI generation unit 400 has information representing the size of each part by default, i.e., has default parameter data. The UI generation unit 400 adds and disposes a part defined by the function setting information 402, but not defined by the UI layout information 401, under the part that is defined by the UI layout information 401 according to the calculation based on the size information and that is disposed at the lowest position.

Figure 15:
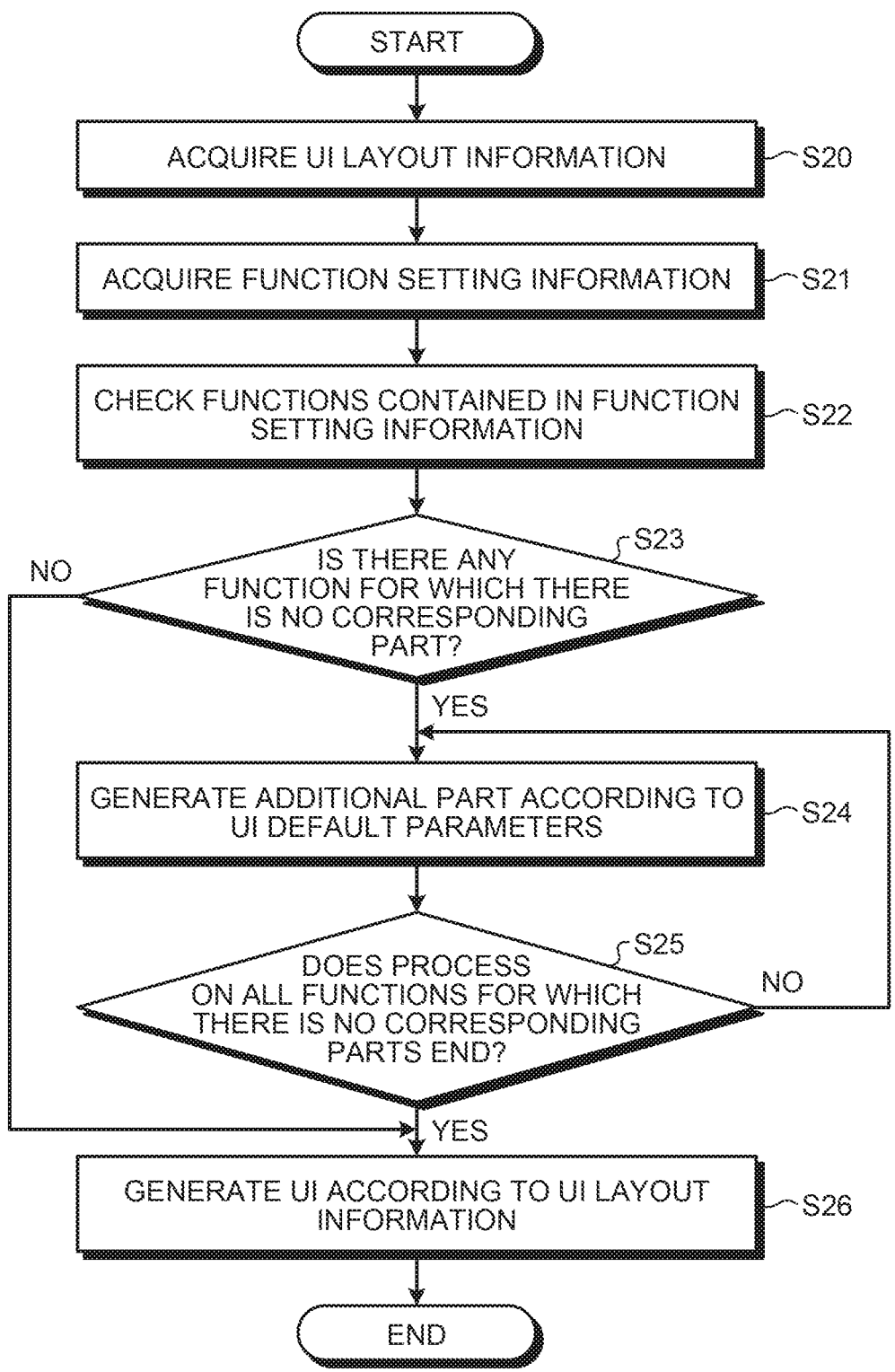
FIG. 15 is an exemplary flowchart of a process for configuring a UI unit from the UI layout information and the function setting information, which is the process that can be used for the first embodiment.

FIG. 15 is a flowchart of an exemplary process for configuring a UI unit from UI layout information and function setting information that can be used for the first embodiment. Each set of processing shown in FIG. 15 is performed by the UI generation unit 400. It is assumed that the UI generation unit 400 is common between the first UI unit and the second UI unit.

At step S20, the UI generation unit 400 acquires the UI layout information 401 from the second UI unit whose UI screen is specified to be used. At step S21, the UI generation unit 400 acquires the function setting information 402 from the first UI unit that originally corresponds to the driver program to be additionally introduced and, at step S22, checks the function contained in the acquired function setting information 402.

At the next step S23, the UI generation unit 400 determines whether there is a function whose corresponding part is specified but not in the UI layout information 401. Upon determining that there is no function for which there is no corresponding part, the UI generation unit 400 moves the process to step S26 and generates a UI according to the UI layout information 401. In this case, the UI according to the UI layout information 401 acquired at step S20 is generated. When a UI is generated at step S26, the sets of processing of the flowchart shown in FIG. 15 are ended.

At step S23, upon determining that there is a function for which there is no corresponding part, the UI generation unit 400 moves the process to step S24. At step S24, according to the default parameters that the UI generation unit 400 has in advance, the UI generation unit 400 generates a part (additional part) corresponding to the function for which there is no corresponding part and generates the set of coordinates of the origin of the part. The UI generation unit 400 updates the UI layout information 401 by, for example, embedding the parameters of the generated part in the UI layout information 401.

FIG. 16 shows exemplary default parameters. According to the example shown in FIG. 16, the default parameters contain an item of "Type", an item of "Window Controll", an item of "Height", and an item of "Width". The item of "Type" represents the type of input and corresponds to the item of "type" in the function setting information 402. The item of "Window Controll" represents the type of part and corresponds to the item of "type" of the UI layout information 401. The items of "Height" and "Width" represent the sizes of the part, i.e., represents the height and height by dot.

At the next step S25, the UI generation unit 400 determines whether the process on all functions for which there is no corresponding part ends. Upon determining that there is still a function for which there is no corresponding part, the UI generation unit 400 returns the process to step S24 to generate a part and an origin for the next function for which there is no corresponding part.

On the other hand, upon determining that the process on all functions for each of which there is no corresponding part ends, the UI generation unit 400 moves the process to step S26 to generate a UI according to the UI layout information 401. In this case, a UI according to the UI layout information 401 that is updated at step S24 is generated. When the UI is generated at step S26, the sets of processing of the flowchart shown in FIG. 15 are ended.

The process of generating an additional part at step S24 will be described more specifically by using the examples shown in FIGS. 13 and 14. In this case, it is necessary to add a part corresponding to the function represented by "name="colorbw"" that is contained in the function setting information 402 shown in FIG. 13 (referred to as the function of "colorbw") to the UI layout information 401 shown in FIG. 14.

The UI layout information 401 shown in FIG. 14 contains only one part for which the value of the item of "name" is "orientation" and this part serves as the part disposed at the lowest position. Furthermore, the value of the item of "params" represents that the part of "orientation" is disposed at the origin at the set of coordinates at the set of coordinates (25, 22) that is the origin.

On the other hand, the function setting information 402 acquired at step S21 (see FIG. 13) represents that the part for which the value of the item of "name" is "colorbw" has the value of "pickone" as the item of "Type". With reference to the default parameters shown in FIG. 16, as for the value of "pickone" of the item of "Type", the type of the part is a combo box, the height is 300 dots, and the width is 174 dots.

Accordingly, the UI generation unit 400 adds 30 dots corresponding to the height with respect to the origin at the set of coordinates (25, 22) of "orientation" to the y coordinate to obtain the origin of the part corresponding to the function of "colorbw". According to the function setting information 402, the UI generation unit 400 knows that, as for the function of "colorbw", the type of input is "pickone" according to the item of "Type". Accordingly, based on the value of "pickone" of the item of "Type" in the default parameters, the UI generation unit 400 generates the part corresponding to the type of "ComboBox" according to the item of "Window Controll" and associates the generated part with the setting item of the function of "colorbw".

In this manner, it is possible to generate the UI layout information 401 where the part corresponding to the function of "colorbw" is disposed under the part corresponding to the function of "orientation". Thereafter, the UI generation unit 400 can generate a UI to which a function is added by performing normal UI generation processing.

Second Embodiment

A second embodiment of the present invention will be described here. According to the first embodiment, whether to use the first UI unit of the already-introduced printer apparatus 30b, or use the original second UI unit of the driver program of the printer apparatus 30a, as the UI unit of the driver program corresponding to the printer apparatus 30a to be additionally introduced is determined by selection performed by the user. Meanwhile, according to the second embodiment, which one of the first UI unit and the second UI unit is used is automatically selected according to the information on the UI units.

More specifically, according to the second embodiment, the version information on the UI unit of the driver program is used as the information on the driver program. The version information is, for example, information corresponding to the release date of the UI unit and the value of the information increases according to the ascending order of the release date.

Figure 17:
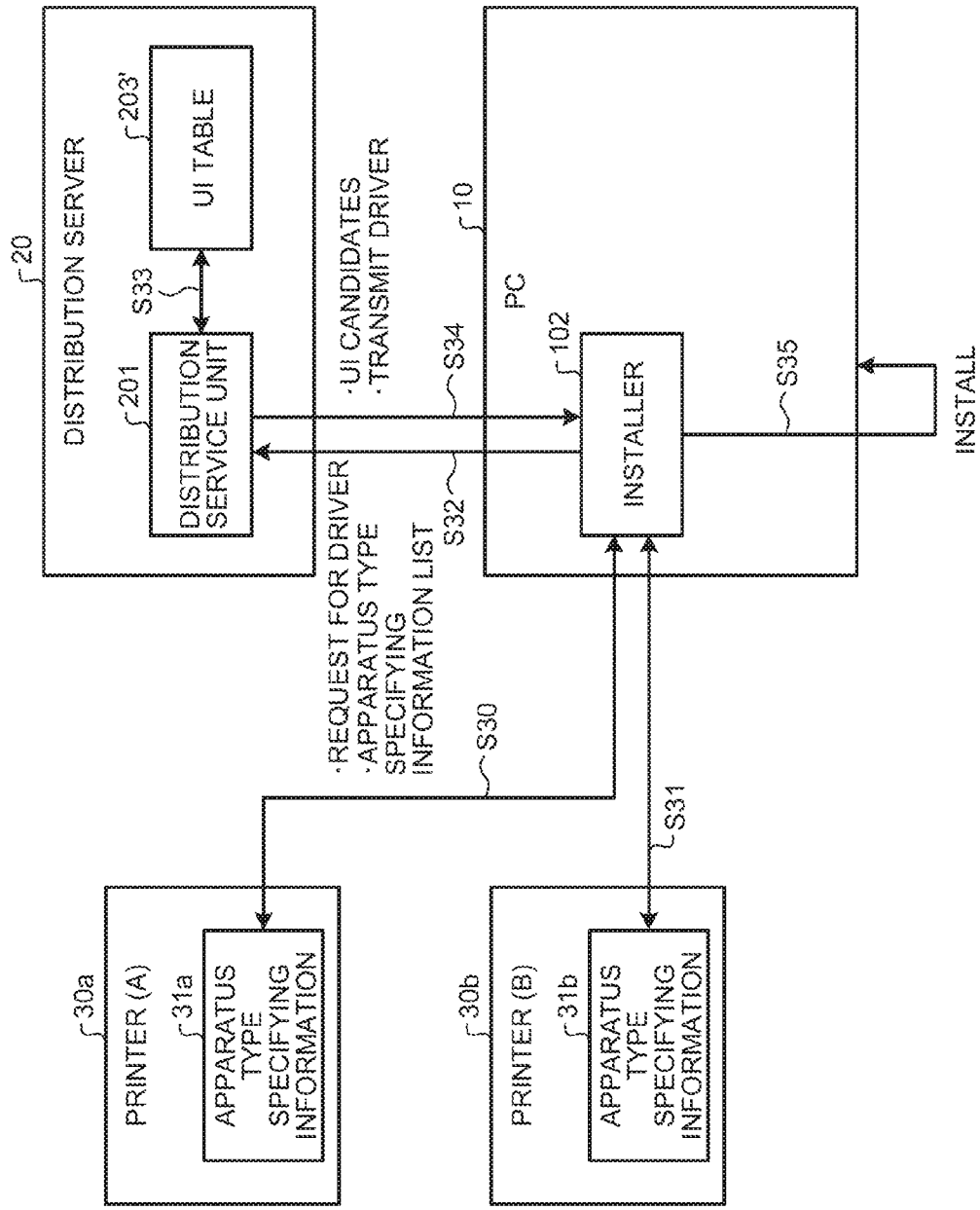
FIG. 17 is a diagram of a flow of an installation process according to a second embodiment of the present invention.

FIG. 17 shows the flow of an installation process according to the second embodiment, the components shown in FIG. 17 common with FIG. 7 are denoted with the same reference numerals as those shown in FIG. 7 to omit detailed descriptions. Furthermore, because the functions of the PC 10 and the distribution server 20 shown in FIG. 17 are approximately the same as those of the first embodiment described with reference to FIGS. 2 and 4, detailed descriptions thereof will be omitted. Similarly, because the configurations according to the first embodiment that are described with reference to FIGS. 5 and 6 can be directly used for the hardware configuration of the PC 10 and the distribution server 20, detailed descriptions thereof will be omitted. Furthermore, FIG. 17 shows functions particularly closely tied to the installation process from among various functions of the PC 10 and the distribution server 20 and other functions are omitted.

According to FIG. 17, the distribution server 20 includes the distribution service unit 201 and a UI table 203'. FIG. 18 shows an example of the UI table 203' according to the second embodiment. As exemplified in FIG. 18, the UI table 203' according to the second embodiment stores the apparatus type specifying information (apparatus type name) and the version information on the UI unit used for the driver program associated with the apparatus type specifying information in association with each other. The version information on the UI unit will be referred to as the "UI version" below.

According to the example shown in FIG. 18, the UI version of "Ver#2" is associated with the apparatus type specifying information of "PRINTER(A))". Similarly, the UI version of "Ver#1" is associated with the apparatus type specifying information of "PRINTER(B))" and the UI version of "Ver#2" is associated with the apparatus type specifying information of "Printer(E))". As described above, multiple sets of apparatus type specifying information can be associated with a UI version. It is assumed that the UI version of "Ver#2" is newer that the UI version of "Ver#1". The UI version is updated when, for example, at least one of the UI layout information 401 and the function setting information 402 contained in the UI unit is updated.

Similarly to the example shown in FIG. 7, according to the example shown in FIG. 17, it is assumed that the printer apparatus 30b is an already-introduced printer apparatus, the printer apparatus 30a is an apparatus to be additionally introduced, and the driver program corresponding to the printer apparatus 30a is not introduced in the PC 10 yet.

For example, in response to a user operation on the PC 10, the installer 102 in the PC 10 starts, so that the process of installing the driver program corresponding to the printer apparatus 30a is started. Once the installation process starts, the installer 102 detects the apparatus type specifying information from each apparatus on the network 40 and acquires the detected apparatus type specifying information (step S30 and step S31). According to this example, the installer 102 acquires the sets of apparatus type specifying information 31a and 31b from the respective printer apparatuses 30a and 30b on the network 40.

The installer 102 transmits the apparatus type specifying information list including the acquired sets of apparatus type specifying information 31a and 31b to the distribution server 20 (step S32). Here, similarly to the example shown in FIG. 7, the apparatus type specifying information 31a on the printer apparatus 30a and the apparatus type specifying information 31b on the printer apparatus 30b are transmitted identifiably to the distribution server 20.

The apparatus type specifying information list and the identifying information that are transmitted from the PC 10 are received by the distribution server 20 and are passed to the distribution service unit 201. The distribution service unit 201 refers to the UI table 203' according to the received apparatus type specifying information list and acquires the UI versions that are associated respectively with the sets of apparatus type specifying information 31a and 31b that are contained in the apparatus type specifying information list (step S33).

The distribution service unit 201 acquires the UI version associated with the apparatus type specifying information 31a from the UI table 203'. At the same time, the distribution service unit 201 determines whether a UI version older than the UI version associated with the apparatus type specifying information 31a is contained in the UI versions associated with the sets of apparatus type specifying information contained in the apparatus type specifying information list transmitted from the PC 10. Upon determining that such an old UI version is contained, the distribution service unit 201 replaces the UI unit of the driver program corresponding to the printer apparatus 30a whose corresponding driver program is required to be installed in the PC 10 with the UI unit of the old UI version.

The distribution service unit 201 transmits the driver program whose UI unit has been replaced to the PC 10 (step S34). The PC 10 receives the driver program transmitted from the distribution server 20 and passes the driver program to the installer 102. The installer 102 installs the passed driver program in the PC 10 (step S35).

Figure 19:
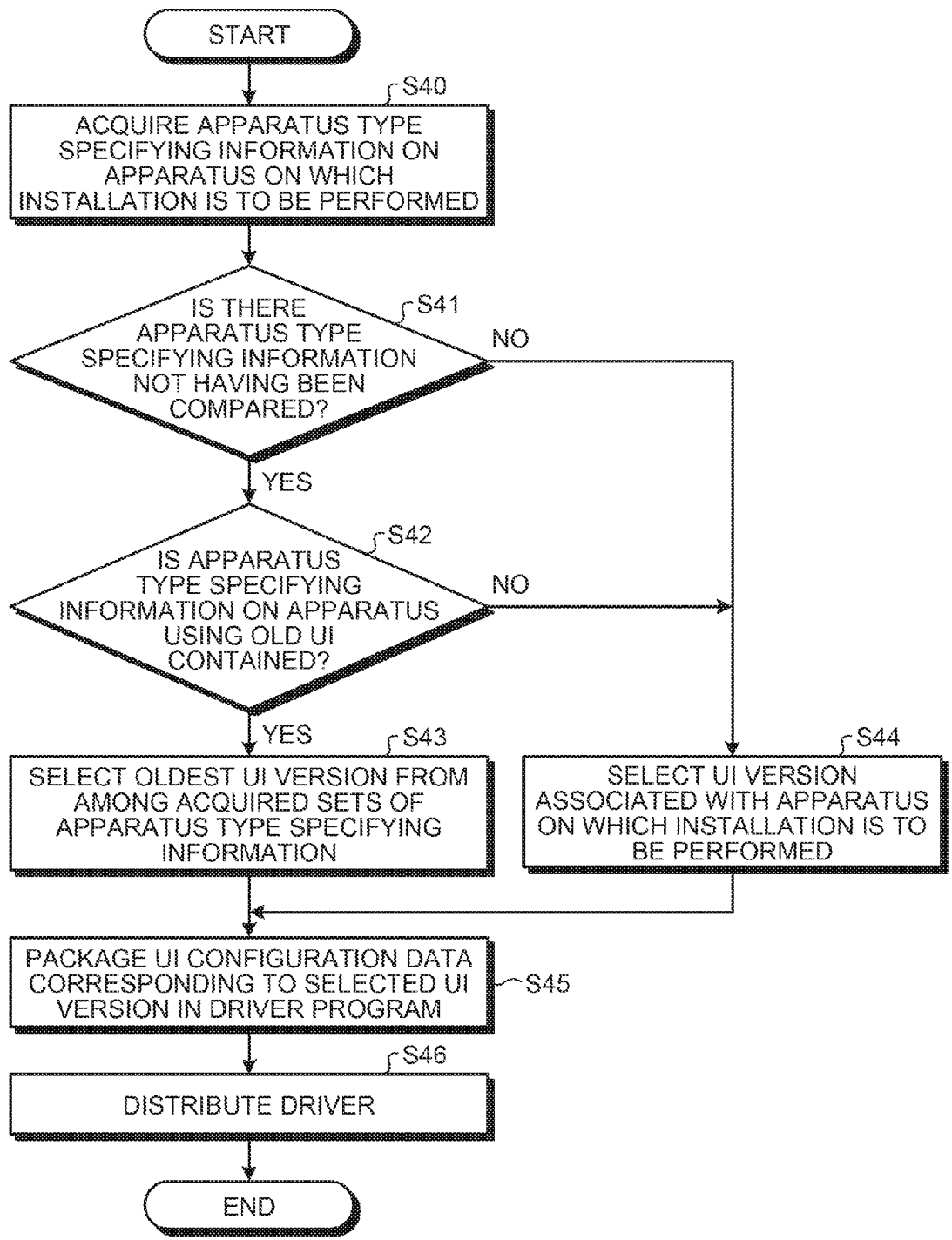
FIG. 19 is a flowchart of a more specific exemplary process performed by a distribution server according to the second embodiment.

FIG. 19 is a flowchart specifically showing the exemplary process performed by the distribution server 20 according to the second embodiment. In the distribution server 20, at step S40, the distribution service unit 201 receives the apparatus type specifying information list transmitted from the PC 10 and acquires, from the received list, the apparatus type specifying information on the printer apparatus 30a whose corresponding driver program is required to be installed in the PC 10.

At the next step S41, the distribution service unit 201 determines whether there is a UI version that has not been compared among UI versions stored in the UI table 203'. Upon determining that there is no UI version that has not been compared, the distribution service unit 201 moves the process to step S44. When, for example, only one printer that is the printer apparatus 30a is connected the PC 10, it is determined that there is no UI version that has not been compared.

At step S44, the distribution service unit 201 selects the UI version associated with the apparatus type specifying information that is acquired at step S40 as the UI version to be used for the UI unit of the driver program to be installed. Once the process at step S44 ends, the distribution service unit 201 moves the process to step S45.

On the other hand, upon determining that there is a UI version not having been compared, the distribution service unit 201 moves the process to step S42. At step S42, the distribution service unit 201 determines whether there is the apparatus type specifying information with to which a UI version older than the UI version associated with the apparatus type specifying information acquired at step S40 is associated. Upon determining that there is not such apparatus type specifying information, the distribution service unit 201 moves the process to step S44.

On the other hand, upon determining that there is such apparatus type specifying information at step S42, the distribution service unit 201 moves the process to step S43. At step S43, the distribution service unit 201 selects the oldest UI version from among the UI versions associated with the sets of apparatus type specifying information corresponding to apparatuses whose corresponding driver programs are not to be installed in the PC 10 that are contained in the apparatus type specifying information list received from the PC 10 at step S40. Upon selecting the UI version, the distribution service unit 291 moves the process to step S45.

At step S45, the distribution service unit 201 packages the configuration data of the UI unit corresponding to the UI version selected at step S43 or step S44 in the driver program to be installed in the PC 10. At the next step S46, the distribution service unit 201 distributes the driver program in which the configuration data of the UI unit is packaged at step S45 to the PC 10.

As described above, according to the second embodiment, according to the UI version, it is determined whether to replace the UI unit of the driver program to be installed in the PC 10 with the UI unit whose UI version is older than that of the UI unit of the driver program originally to be installed. For this reason, the work of the process of installing the driver program corresponding to the printer apparatus 30*a* to be additionally installed and the driver program and of operations on the installed driver program is reduced.

Third Embodiment

A third embodiment of the invention will be described here. The third embodiment is an example where a printer apparatus contains the function of the distribution server 20 and part of the function of the PC 10 according to the first and second embodiment that are described above.

Figure 20:
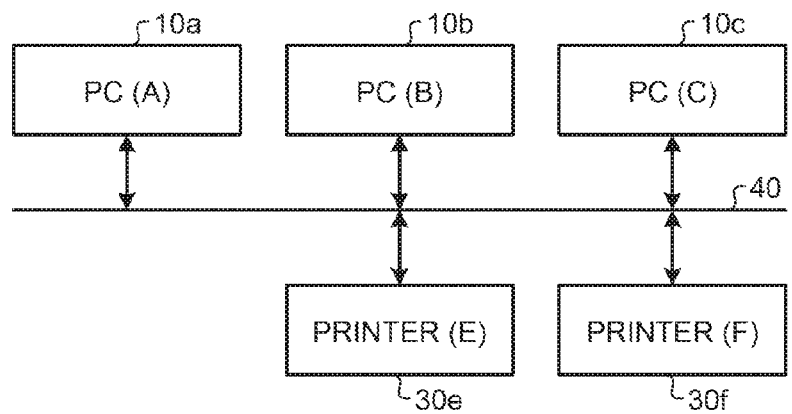
FIG. 20 is a block diagram of an exemplary configuration of an information processing system according to a third embodiment of the invention.

FIG. 20 shows an exemplary configuration of an information processing system according to the third embodiment. According to FIG. 1, the information processing system includes at least one PC, that is PCs 10*a*, 10*b* and 10*c*, and the multiple printer apparatuses 30*e* and 30*f* that are all communicably connected to one another via the network 40, such as a LAN. According to FIG. 20, the PCs 10*a*, 10*b* and 10*c* are shown also respectively as "PC(A)", "PC(B)" and "PC(C)". Similarly, the printer apparatuses 30*e* and 30*f* are shown also respectively as "PRINTER(E)" and "PRINTER(F)".

FIG. 20 shows the example where the information processing system includes the three PCs 10*a*, 10*b* and 10*c* and the two printer apparatuses 30*e* and 30*f*; however, the embodiment is not limited to this example. In other words, the information processing system according to the second embodiment may include only one or two PCs or include four or more PCs. Furthermore, the information processing system may include three or more printer apparatuses. Furthermore, part or all of the multiple printer apparatuses of the information processing system may be MFPs. Furthermore, the network 40 may use wired or wireless communications.

As for the configuration shown in FIG. 20, it is assumed that the printer apparatus 30*f* is already connected to the network 40 and the driver program corresponding to the printer apparatus 30*f* is already installed in at least one of the PCs 10*a* to 10*c*. On the other hand, it is assumed that the printer apparatus 30*e* is additionally connected to the network 40 and the driver program corresponding to the printer apparatus 30*e* is not installed in any of the PCs 10*a* to 10*c*.

Furthermore, schematically, at least one of the printer apparatuses 30*e* and 30*f* (here, the printer apparatus 30*e*) includes part of the above-described functions of the distribution server 20 and the PC 10 according to the first embodiment. In the second embodiment, a process of installing a driver program corresponding to the printer apparatus 30*e* in the PCs 10*a* to 10*c* is performed via the printer apparatus 30*e*.

Figure 21:
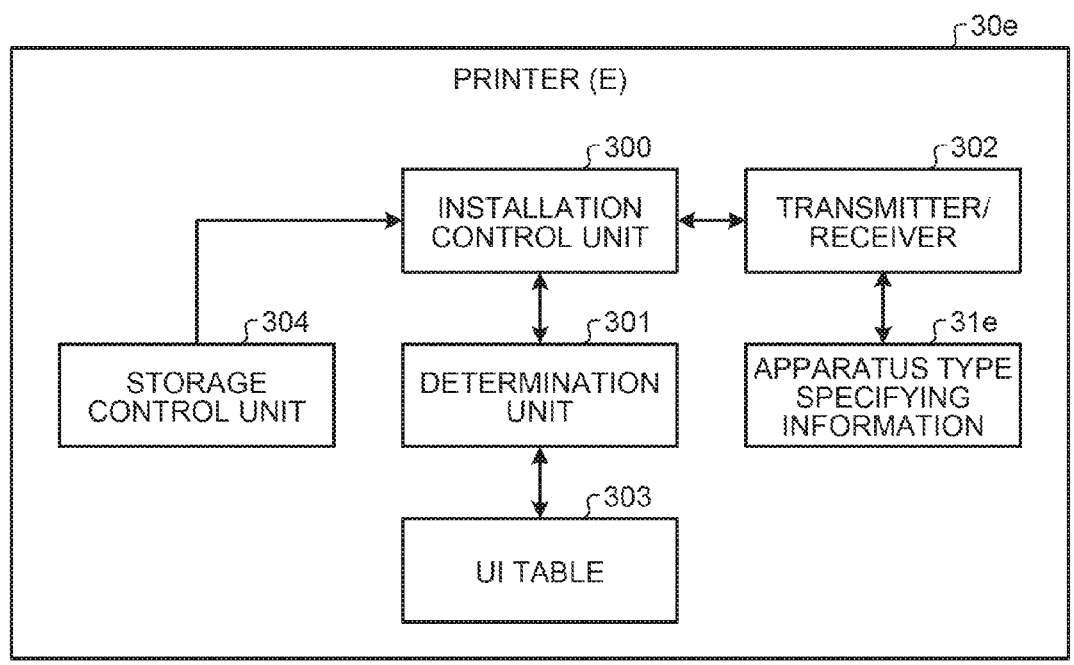
FIG. 21 is an exemplary functional block diagram for explaining functions of a printer apparatus according to the third embodiment.

FIG. 21 is an exemplary functional block diagram for explaining the functions of the printer apparatus 30*e* according to the third embodiment. According to FIG. 21, the printer apparatus 30*e* includes an installation control unit 300, a determination unit 301, a transmitter/receiver 302, a UI table 303, a storage control unit 304, and apparatus type specifying information 31*e*. From among them, the installation control unit 300, the determination unit 301 and the transmitter/receiver 302 can be configured by using a program that runs on a CPU. Alternatively, part or all of the installation control unit 300, the determination unit 301 and the transmitter/receiver 302 may be configured by using hardware.

The installation control unit 300 controls the process of installing the driver program in each of the PCs 10*a* to 10*c* performed by the printer apparatus 30*e*. The installation control unit 300 includes a UI function for presenting information to the user and accepting a user operation in the printer apparatus 30*e*. The installation control unit 300 also includes functions equivalent to the UI specifying unit 210 and the combining unit 211, which are described above with reference to FIG. 2, and a function equivalent to the acquisition unit 111, which is described above with reference to FIG. 4.

When there are multiple PCs serving as candidate of PC in which the driver program corresponding to the printer apparatus 30*e* is to be installed, the determination unit 301 determines a PC in which the driver program is to be installed. The transmitter/receiver 302 transmits/receives data via the network 40.

The UI table 303 corresponds to the UI table 203 described with reference to FIG. 3. The UI table 303 is a table that associates sets of apparatus type specifying information that identify printer apparatuses and UI types. Here, for explanation, it is assumed that the UI table 303 associates UI types of "TYPE#A", "TYPE#B", "TYPE#A" and "TYPE#X" respectively with the printers (E) to (H).

The storage control unit 304 controls storing data in a non-volatile storage medium, such as a hard disk drive or a flash memory, and reading data from the storage medium. The storage medium for the storage control unit 304 stores at least a driver program for controlling the printer apparatus 30*e* via each of the PCs 10*a* to 10*c* and data for configuring the UI unit that is used for the driver program. The data for configuring the UI unit includes the UI layout information 401 and the function setting information 402. The data may further contain the UI generation unit 400.

The storage medium for the storage control unit 304 may further store image data of a display image displayed by the UI unit that is used from the driver program. For the display image, for example, an image obtained by scaling down the UI screen displayed by the UI unit can be used. The display image is created in advance according to the UI layout information 401 and the function setting information 402 that configures the UI unit and is stored in association with each UI unit in the storage medium.

The apparatus type specifying information 31e is information for identifying the apparatus type of the printer apparatus 30e and, for example, a PnP name may be used. The apparatus type specifying information 31e may be stored in the storage medium for the storage control unit 304 or may be stored in advance in the ROM of the printer apparatus 30e.

Figure 22:
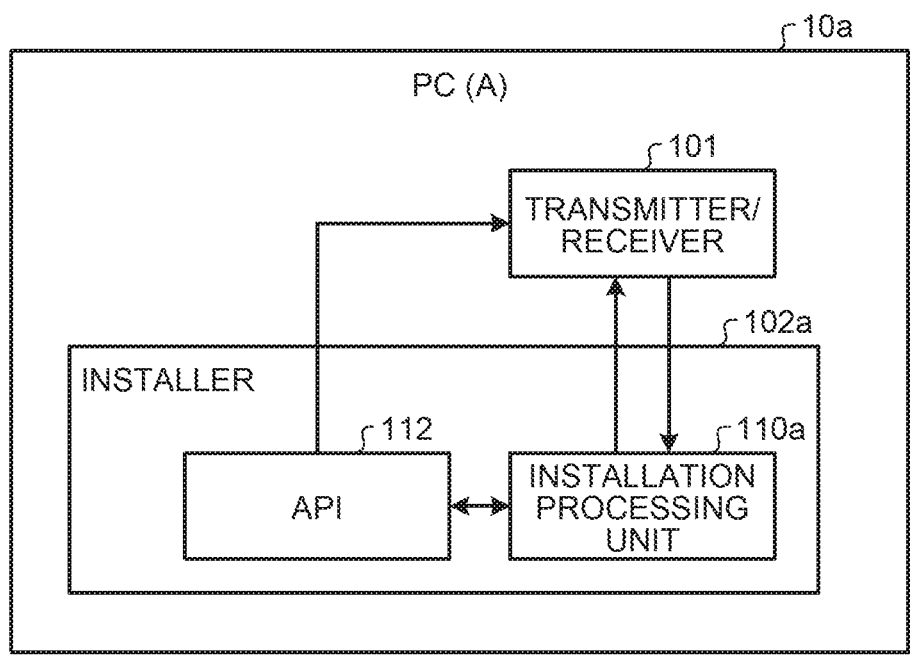
FIG. 22 is an exemplary functional block diagram for explaining functions of a PC that can be used for the third embodiment.

FIG. 22 is an exemplary functional block diagram for explaining the functions of the PC 10a that can be used for the third embodiment. The configuration shown in FIG. 22 may be used similarly to the PCs 10b and 10c. According to FIG. 22, the PC 10a includes the transmitter/receiver 101 and an installer 102a. The transmitter/receiver 101 and the installer 102a may be configured by using a program that runs on a CPU. Alternatively, part or all of the transmitter/receiver 101 and the installer 102a may be configured by using hardware.

The transmitter/receiver 101 transmits/receives data via the network 40. The installer 102a corresponds to the installer 102 described with reference to FIG. 4. The installer 102a performs the process of installing the driver program in the PC 10a.

The installer 102a includes an installation processing unit 110a and an application programming interface (API) 112. The API 112 is an interface for the installation processing unit 110a. The API 112 is capable of controlling the installation processing unit 110a according to, for example, an instruction that is transmitted via the network 40.

Figure 23:
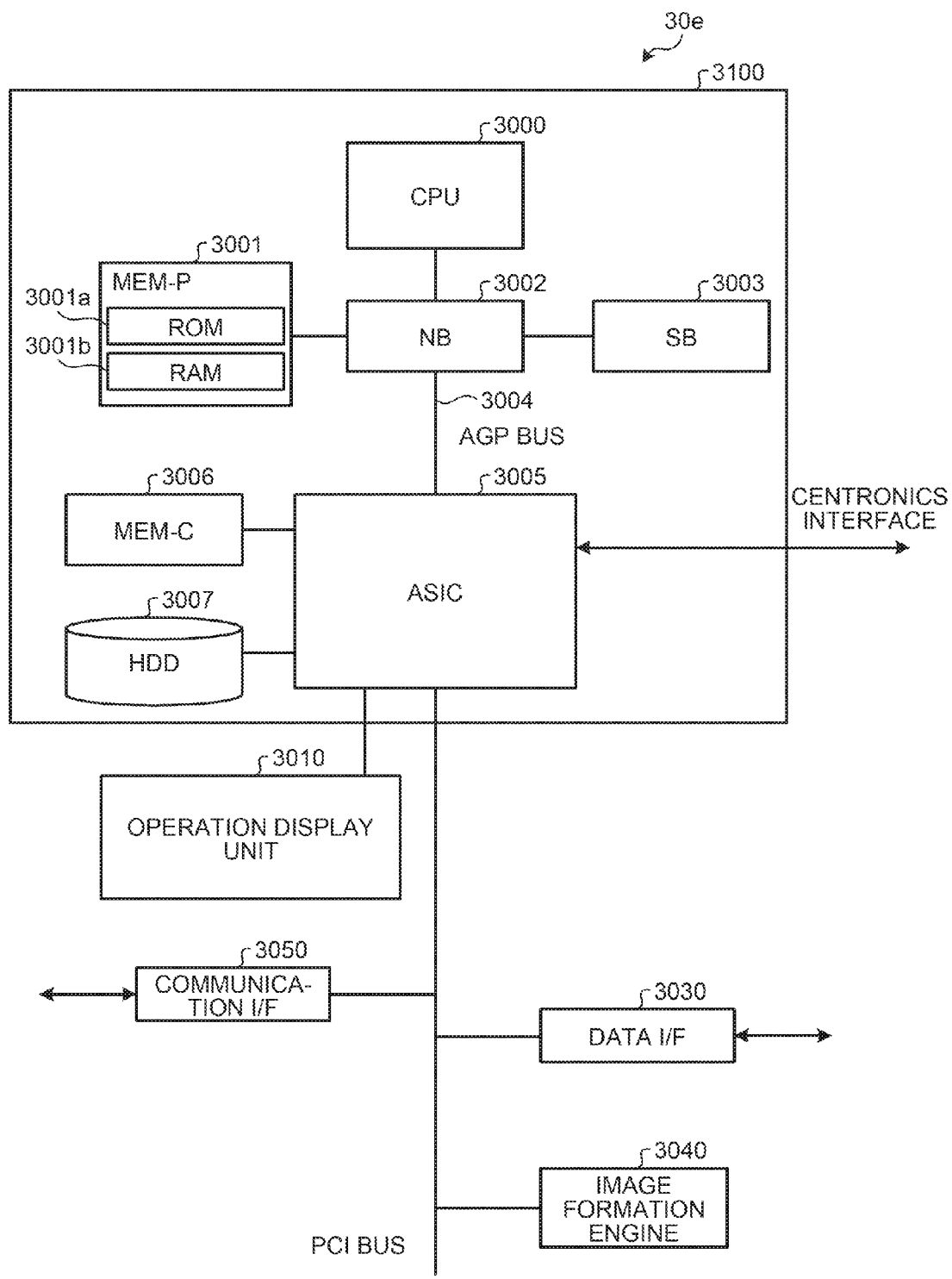
FIG. 23 is a block diagram of an exemplary hardware configuration of a printer apparatus that can be used for the third embodiment.

FIG. 23 shows an exemplary hardware configuration of the printer apparatus 30e that can be used for the third embodiment. According to the example shown in FIG. 23, the printer apparatus 30e has a configuration in which a controller 3100 and an image formation engine 3040 are connected via a peripheral component interface (PCI) bus. The controller 3100 performs various types of control, such as control on the whole printer apparatus 30e, drawing control, and control on input and display on the operation display unit 3010. The image formation engine 3040 is, for example, a printer engine connectable to the PCI bus. The image formation engine 3040 includes, for example, a black and white plotter, a single-drum color plotter, and a four-drum color plotter. The image formation engine 3040 includes, in addition to so-called engine components, such as those plotters, an image processing component that performs error distribution or gamma conversion.

The controller 3100 includes a CPU 3000, a north bridge (NB) 3002, a system memory (MEM-P) 3001, a south bridge (SB) 3003, a local memory (MEM-C) 3006, an application specific integrated circuit (ASIC) 3005, and a hard disk drive (HDD) 3007. The NB 3002 and the ASIC 3005 are connected via an accelerated graphics port (AGP) bus 3004. The MEM-P 3001 includes a ROM 3001a and a RAM 3001b.

The CPU 3000 controls the whole printer apparatus 30e. The CPU 3000 has a chipset consisting of the NB 3002, the MEM-P 3001 and the SB 3003. The CPU 3000 is connected to other devices via the chipset.

The NB 3002 is a bridge for connecting the CPU 3000 to the MEM-P 3001, the SB 3003 and the ASIC 3005. The NB 3002 includes a memory controller that controls read/write from/to the MEM-P 3001, a PCI master, and an AGP target.

The MEM-P 3001 is a system memory that is used as a memory for storing programs and data, a memory for loading programs and data, a drawing memory for printer, etc. The MEM-P 3001 includes the ROM 3001a and the RAM 3001b. The ROM 3001a is a memory dedicated to reading that is used as a memory for storing programs and data. The RAM 3001b is a memory for loading programs and data and a readable/writable memory that is used as a drawing memory for printer. Reading/writing from/to the MEM-P 3001 can be controlled by the above-described storage control unit 304.

The SB 3003 is a bridge for connecting the NB 3002 to the PCI device and peripheral devices. The SB 3003 is connected to the NB 3002 via a PCI bus. A communication I/F 3050 that performs communications via the network 40 is connected to the PCI bus.

The ASIC 3005 is an integrated circuit (IC) used for for image processing that has hardware components for image processing. The ASIC 3005 functions as a bridge that connects the AGP 3004, the PCI bus, the HDD 3007, and the MEM-C 3006 to one another. The ASIC 3005 includes a PCI target, an AGP master, an arbiter serving as the core of the ASIC 3005, a memory controller that controls the MEM-C 3006, and multiple direct memory access controllers (DMAC) that, for example, rotates image data by using, for example, a hardware logic, and a PCI unit that performs data transfer to/from the image formation engine 3040 via the PCI bus. A data I/F 3030 is connected to the ASIC 3005 via the PCI bus. For example, a USB can be used for the data I/F 3030.

The operation display unit 3010 is directly connected to the ASIC according to the example shown in FIG. 23. The operation display unit 3010 includes an input device that accepts a user input and a display device that displays information by using, for example, a liquid crystal display (LCD). The operation display unit 3010 may include an input device using a hardware key or may be configured as a so-called touch panel in which an input device and a display device are integrally configured. The UI of the installation control unit 300 is used for the operation display unit 3010.

The MEM-C 3006 is a local memory that is used as an image buffer or a code buffer. The HDD 3007 is a storage for storing data that, for example, accumulates image data, programs, font data, and forms. The above-described storage control unit 304 can control read/write in/from the HDD 3007. The UI table 303 is stored in the HDD 3007.

The above-described installation control unit 300, the determination unit 301, and the transmitter/receiver 302 are implemented by using the program that runs on the CPU 3000. The program may be previously stored in the ROM 3001a or the HDD 3007 and thus provided. Alternatively, the program may be stored in a computer that is connected to the network 40 to which the communication I/F 3050 is connected and the program may be configured to be downloaded by the PC 10 via the network 40 and thus provided. The program may be configured to be provided or distributed via the network 40.

Furthermore, the program may be recorded in a computer-readable recording medium, such as a CD or a DVD, in a file in an installable form executable form and thus provided. In this case, the program is provided to the printer apparatus 30e via, for example, an external driver device or an external computer that is connected to the data I/F 3030.

The program has a module configuration including, for example, the above-described units (the installation control unit 300, the determination unit 301 and the transmitter/ receiver 302). As for practical hardware, the CPU 3000 reads the program from the HDD 3007 and executes the program so that the above-described units are loaded into the main storage device (such as the RAM 3001b), so that the units are generated in the main storage device.

Figure 24:
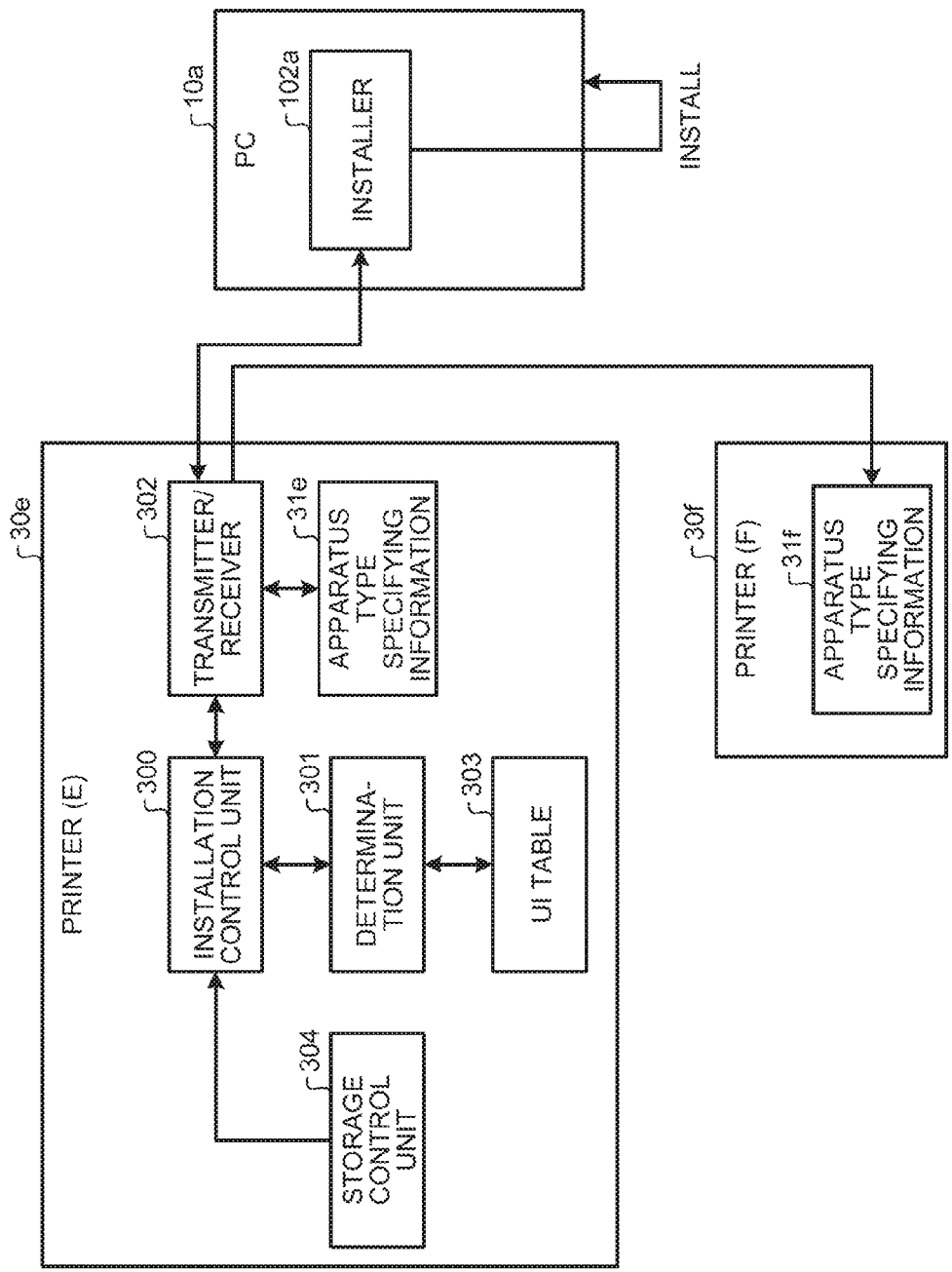
FIG. 24 is a diagram for schematically explaining an installation process according to the third embodiment.

With reference to FIG. 24, the installation process according to the third embodiment will be described schematically. As shown in FIG. 24, in the printer apparatus 30e, the installation control unit 300 causes the transmitter/receiver 302 to communicate with another printer apparatus that is the printer apparatus 30f connected to the network 40 to acquire the apparatus type specifying information 31f of the printer apparatus 30f. For example, according to a user operation, the installation control unit 300 determines a UI type to be used for a driver program to be installed in a PC (the PC 10a) according to the acquired apparatus type specifying information 31f and the apparatus type specifying information 31e of the printer apparatus 30e.

When the determined UI type is different from the UI type that is associated with the apparatus type specifying information 31e of the printer apparatus 30e, the installation control unit 300 replaces the UI unit of the driver program. The installation control unit 300 transmits the driver program whose UI unit has been replaced to the PC 10a to which the driver program is to be installed. The installer 102a installs the driver program transmitted from the printer apparatus 30e into the PC 10a.

Figure 25:
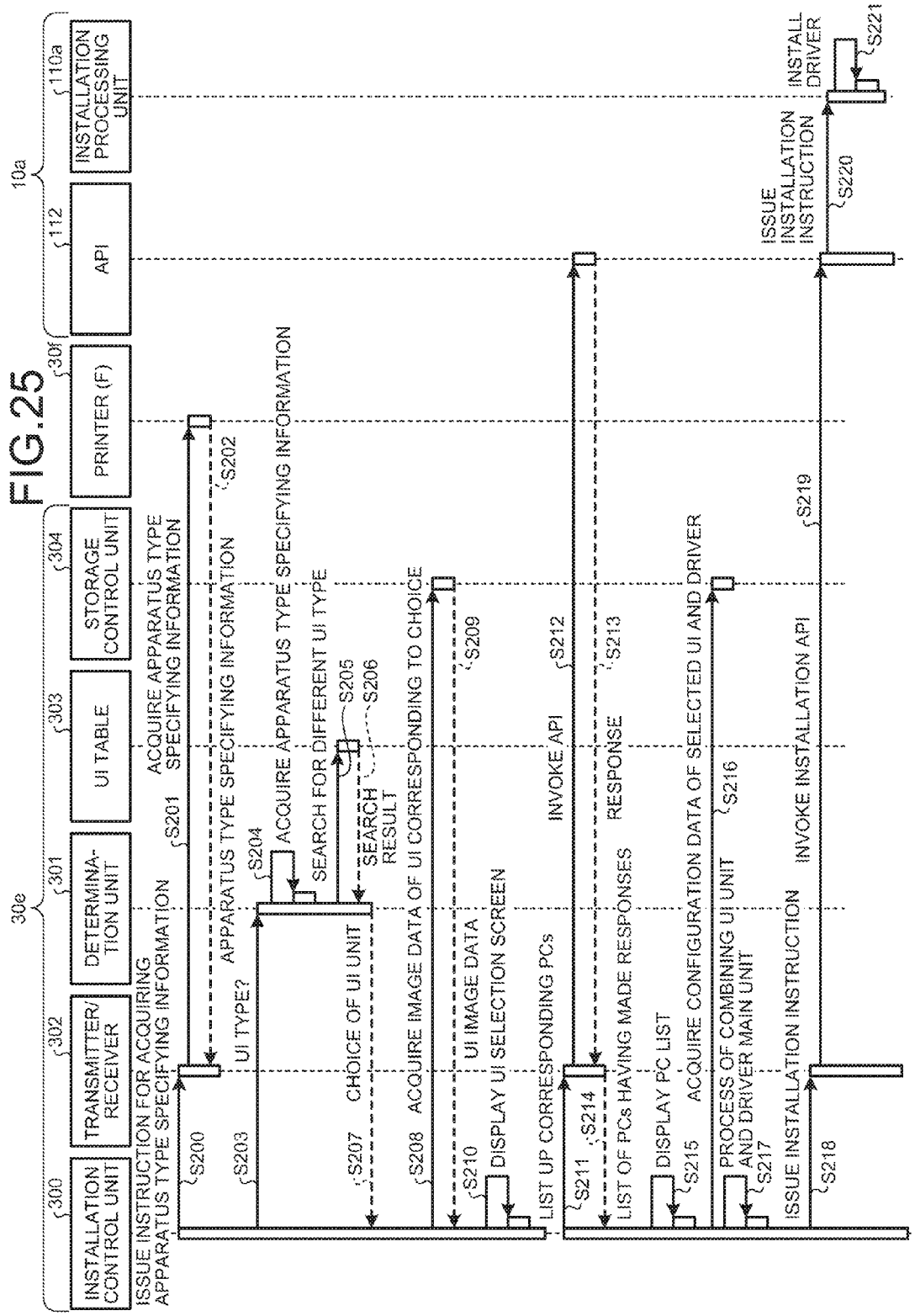
FIG. 25 is a sequence chart of sets of processing according to the third embodiment.

FIG. 25 is a sequence chart of a set of processing according to the third embodiment. Components shown in FIG. 25 that are common with the components shown in FIGS. 21, 22 and 24 are denoted with the same reference numerals as those shown in FIGS. 21, 22 and 24 to omit detailed descriptions. In order to avoid complication, FIG. 25 shows only main function units of the PC 10a and the PCs 10b and 10c are omitted.

In the printer apparatus 30e that is additionally connected to the network 40, in response to a user operation on the operation display unit 3010, the installation control unit 300 starts the process of installing the driver program for controlling the printer apparatus 30e in the PCs 10a to 10c. The installation control unit 300 issues, to the transmitter/receiver 302, an instruction for acquiring apparatus type specifying information of another printer connected to the network 40 (step S200). According to the instruction, the transmitter/receiver 302 communicates with each printer apparatus that is connected to the network 40, detects the apparatus type specifying information of each printer apparatus, and acquires the apparatus type specifying information (step S201). According to the example shown in FIG. 24, depending on the communications with the printer apparatus 30f, the transmitter/receiver 302 detects and acquires the apparatus type specifying information 31f. The transmitter/receiver 302 passes the acquired apparatus type specifying information 31f to the installation control unit 300 (step S202).

The installation control unit 300 passes, to the determination unit 301, the apparatus type specifying information 31e received from the transmitter/receiver 302 (step S203). The determination unit 301 acquires the apparatus type specifying information of the printer apparatus 30e (step S204). Furthermore, the determination unit 301 refers to the UI table 303 according to the apparatus type specifying information 31f received from the transmitter/receiver 302 and performs searching on whether a UI type different from the UI type associated with the apparatus type specifying information 31e is associated with the apparatus type specifying information 31f (step S205).

As described above, in the UI table 303, the UI type of "Type#A" is associated with the apparatus type specifying information 31e of the printer apparatus 30e (PRINTER(E)). Furthermore, the UI type of "Type#X" is associated with the apparatus type specifying information 31f of the printer apparatus 30f (PRINTER(F)). This represents that the associated UI type differs between the printer apparatus 30e that performs the process of installing the driver program and another printer apparatus that is the printer apparatus 30f.

On the network 40, the sets of apparatus type specifying information corresponding to PRINTER(G) and PRINTER (H) that are stored in the UI table 303 are not detected. In this case, the determination unit 301 ignores the UI types associated respectively with the PRINTER(G) and PRINTER (H). Furthermore, in the UI table 303, the UI type of "Type#X" is stored as a UI type different from the UI type associated with the printer apparatus 30e. However, the apparatus type specifying information list that is transmitted from the PC 10 does not contain the apparatus type specifying information (PRINTER(H)) associated with the UI type of "Type#X". For this reason, the determination unit 301 also ignores the UI type of "Type#X".

The determination unit 301 passes the result of searching at step S205 to the instillation control unit 300 (step S206). More specifically, according to the above-describe example, the determination unit 301 passes, as a choice of UI unit, the UI type of "Type#B" that is different from the UI type of "Type#A" and that corresponds to the apparatus type identifying information of an apparatus that is connected to the printer apparatus 30e via the network 40 (in this case, the apparatus type specifying information 31f) to the installation control unit 300 (step S207).

According to the UI type of "Type#B" that is passed from the determination unit 301 and the UI type of "Type#A" of the UI unit contained in the driver program corresponding to the printer apparatus 30e, the installation control unit 300 generates a UI of the selection screen for selecting a UI type to be used for the driver program corresponding to the printer apparatus 30e and displays the UI on the operation display unit 3010. Here, the installation control unit 300 acquires image data representing display images of the UI types of "Type#A" and "Type#B" from the storage medium (step S208 and step S209) and displays the images based on the acquired respective sets of image data on the selection screen (step S210).

Figure 26:
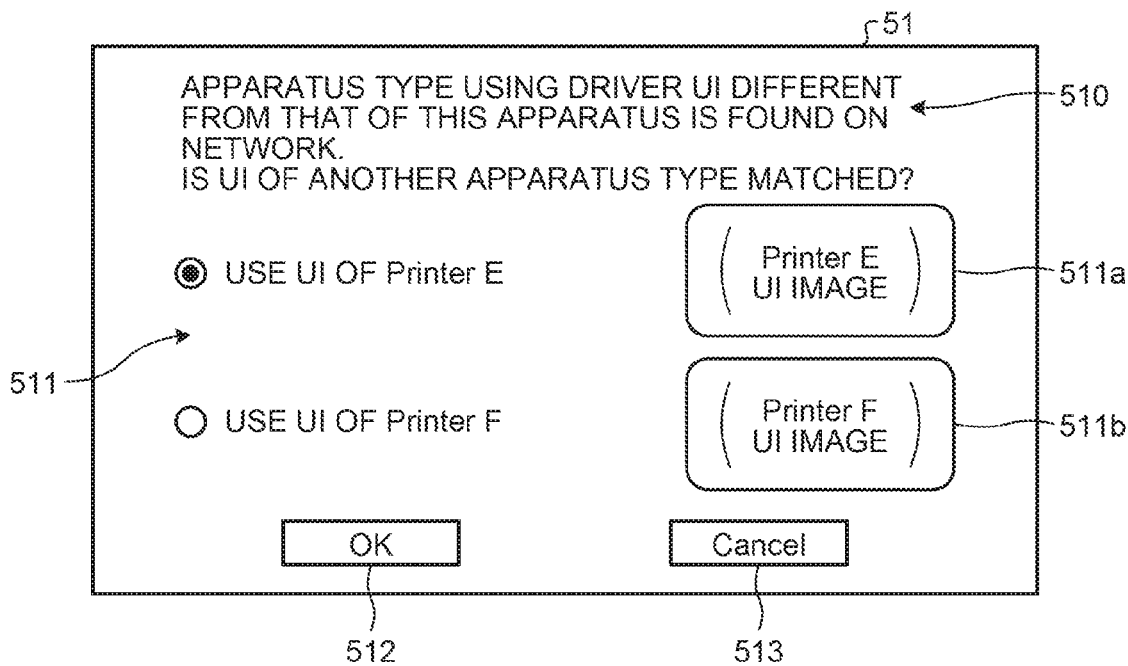
FIG. 26 is a diagram of an exemplary selection screen on which display images of respective UI types can be displayed, which is a selection screen that can be used for the third embodiment.

FIG. 26 shows an example of a selection screen 51 capable of displaying an image of a display image of each UI type. According to FIG. 26, the selection screen 51 includes a message display area 510, a selection input section 511, and buttons 512 and 513. On the message display area 510, a message that is represented by the instillation control unit 300 to the user is displayed. The content of message is the same as that shown on the message display area 500 described with reference to FIG. 8 and thus the same descriptions will be omitted.

The selection input section 511 accepts a user input for selecting a UI to be used for the driver program to be installed. According to the example shown in FIG. 26, the item of "Printer E" representing the already-introduced printer apparatus 30e and the item of "Printer F" representing the printer apparatus 30f to be additionally introduced are displayed on the selection input section 511, and any one of the items is selected by using a radio button.

The selection input section 511 is provided with image display areas 511a and 511b at positions (in this example, the y coordinates) corresponding respectively to the items of "Printer E" and "Printer F". On the image display area 511a, an image according to the image data that is stored in, for example, the MEM-P 3001 or the HDD 3007 in association with the UI unit corresponding to the item of "Printer E" is displayed. Similarly, on the image display area 511b, an image according to the image data that is stored in, for example, the MEM-P 3001 or the HDD 3007 in association with the UI unit corresponding to the item of "Printer F" is displayed.

As described above, displaying display images of UIs allows the user to intuitively select the item of "Printer E" or the item of "Printer F", which is preferable.

The button 512 is a button for determining selection according to a user input made on the selection input section 511. The button 513 is a cancel button. For example, by operating the button 513, the process of installing the driver program corresponding to the printer apparatus 30e to be additionally introduced can be stopped.

Alternatively, for example, the selection screen 50 described with reference to FIG. 8 may be used as the selection screen.

FIG. 25 will be refereed back here. The determination unit 301 acquires the user input made on the selection screen 51 and, according to the acquired user input, determines a UI type to be used for the driver program corresponding to the printer apparatus 30e. The determination unit 301 passes information representing the determined UI type to the instillation control unit 300.

Upon receiving the UI type from the determination unit 301, the installation control unit 300 issues, to the transmitter/receiver 302, an instruction for detecting and listing up PCs having the installer 102 installed therein from among the PCs 10a to 10c on the network 40 (step S211) According to this instruction, the transmitter/receiver 302 invokes the API 112 of each of the PCs 10a to 10c (step S212). In each of the PCs having the installer 102a installed therein among the PCs 10a to 10c, the API 112 in the installer 102a makes a response to the request (step S213).

The response made by the API 112 of each of the PCs 10a to 10c is transmitted to the printer apparatus 30e and received by the transmitter/receiver 302. The transmitter/receiver 302 passes a list of PCs, among the PCs 10a to 10c, from which responses have been received to the installation control unit 300 (step S214). For information representing the PCs, the names or internet protocol (IP) addresses of the PCs on the network 40 may be used.

According to the information passed from the transmitter/receiver 302, the installation control unit 300 generates a UI of a PC selection screen containing a PC list for selecting a PC in which the driver program corresponding to the printer apparatus 30e is to be installed and displays the UI on the operation display unit 3010 (step S215).

Figure 27:
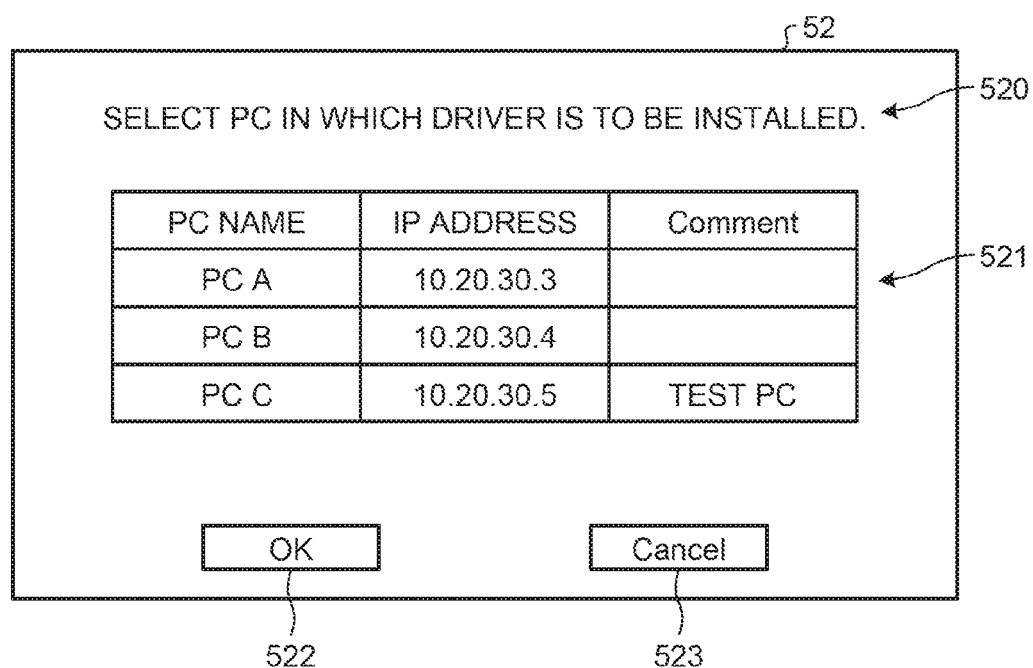
FIG. 27 is a diagram of an exemplary PC selection screen according to the third embodiment.

FIG. 27 shows an exemplary PC selection screen according to the third embodiment. According to FIG. 27, a PC selection screen 52 includes a message display area 520, a PC selection area 521, and buttons 522 and 523.

On the message display area 520, a message represented by the installation control unit 300 to the user is displayed. According to this example, the installation control unit 300 displays a message urging selection of a PC in which the driver program corresponding to the printer apparatus 30e is to be installed on the message display area 520.

On the PC selection area 521, information on the PCs listed up by the transmitter/receiver 302 is displayed in a list. According to the example shown in FIG. 27, on the PC selection area 521, information on one PC is displayed on a record containing items of "PC NAME", "IP ADDRESS" and "Comment". On the item of "PC name", for example, the name of the PC on the network 40 is displayed. On the item of "IP address", the IP address of the PC on the network 40 is displayed. On the item of "Comment", supplementary information on the PC is displayed.

For example, it is assumed that each of the PCs 10a to 10c has the installer 102a installed therein. In this case, as exemplified in FIG. 27, PC names of "PC A", "PC B" and "PC C" corresponding respectively to the PCs 10a to 10c and IP addresses of the respective PCs are displayed in the respective records.

The button 522 is a button for determining selection according to a user input made on the PC selection area 521. The button 523 is a cancel button. For example, by operating the button 523, the process of installing the driver program corresponding to the printer apparatus 30e to be additionally introduced can be stopped.

The installation control unit 300 acquires the user input made on the PC selection screen 52 and, according to the acquired user input, determines a PC in which the driver program corresponding to the printer apparatus 30e is to be installed. Here, it is assumed that the PC 10a is selected as a PC in which the driver program corresponding to the printer apparatus 30e is to be installed. On the PC selection screen 52, it is possible to select multiple PCs as PCs in which the driver program corresponding to the printer apparatus 30e is to be installed.

Descriptions will refer back to FIG. 25 here. Upon determining a PC in which the driver program is to be installed, as described above, for example, data that configures the UI unit corresponding to the UI type selected on the selection screen 51 and the driver program corresponding to the printer apparatus 30e are acquired from, for example, the MEM-P 3001 or the HDD 3007 via the storage control unit 304 (step S216). The installation control unit 300 combines the data configuring the UI unit fetched via the storage control unit 304 from the MEM-P 3001 or the HDD 3007 and the program main unit that the driver program includes (step S217).

The installation control unit 300 passes, to the transmitter/receiver 302, an instruction for installing the driver program that is generated by this combining to the PC 10a that is selected on the PC selection screen 52 (step S218). According to this instruction, the transmitter/receiver 302 transmits the driver program that is generated by performing the combining processing at step S217 to the PC 10a selected as one in which the driver program is to be installed, invokes the API 112, and issues an instruction for installing the driver program to the API 112 (step S219).

In the PC 10a, according to the installation instruction issued at step S219, the API 112 issues, to the installation processing unit 110a, an instruction for installing the driver program transmitted from the printer apparatus 30e (step S220). According to the instruction, the installation processing unit 110a installs the driver program in the PC 10a (step S221).

According to the third embodiment, even when the driver program is installed in a PC via the printer apparatus, it is possible to select a UI type to be used for the driver program from the original UI type of the driver program and the UI type corresponding to the driver program of another printer apparatus that is the already-introduced printer apparatus. This reduces the work of the process of installing the driver program corresponding to the printer apparatus to be additionally introduced and of operations on the installed driver program.

Fourth Embodiment

Figure 28:
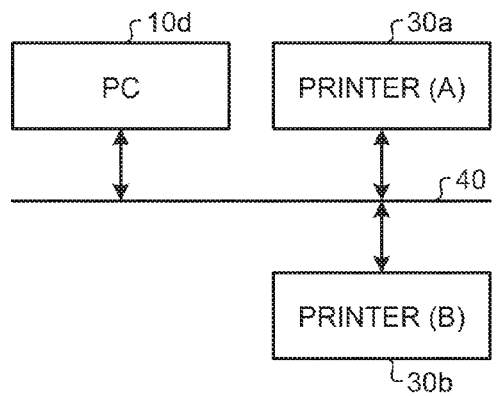
FIG. 28 is a block diagram of an exemplary configuration of an information processing system according to a fourth embodiment of the present invention.

A fourth embodiment of the invention will be described here. FIG. 28 shows an exemplary configuration of an information processing system according to the fourth embodiment. According to FIG. 28, the information processing system includes a PC 10d and a plurality of printer apparatuses that are the printer apparatuses 30a and 30b that are communicably connected to each other via the network 40, such as a LAN. FIG. 28 shows the printer apparatuses 30a and 30b also as "PRINTER(A)" and "PRINTER(B)". Components shown in FIG. 28 that are common with those shown in FIG. 1 are denoted with the same reference numerals as those shown in FIG. 1 to omit detailed descriptions.

FIG. 28 exemplifies that the information processing system includes the two printers that are the printer apparatuses 30a and 30b; however, the embodiment is not limited to this. In other words, the information processing system according to the fourth embodiment may include three or more printer apparatuses or each printer apparatus may be an MFP that incorporates multiple functions, such as the printer function, the scanner function, the copy function, and the FAX function, in a single housing.

According to the fourth embodiment, the PC 10d includes the functions of the distribution server 20 according to the first embodiment. In other words, the PC 10d includes a UI table that associates sets of apparatus type specifying information and UI types, the driver program corresponding to the printer apparatus 30a to be additionally introduced after the already-introduced printer apparatus 30b, and the configuration data of the UI unit of each of multiple UI types.

For the hardware configuration of the PC 10d, it is assumed that the hardware configuration described with reference to FIG. 5 is used directly.

In response to an instruction for installing the driver program corresponding to the printer apparatus 30a to be additionally introduced, the PC 10d acquires sets of apparatus type specifying information on the printer apparatuses 30a and 30b that are connected to the network 40. According to the acquired sets of apparatus type specifying information, the PC 10d then determines a UI type to be used for the driver program to be installed. When the determined UI type is different from the UI type associated with the apparatus specifying information on the printer apparatus 30a, the PC 10d replaces the UI unit of the driver program and then installs the driver program in the PC 10d.

Figure 29:
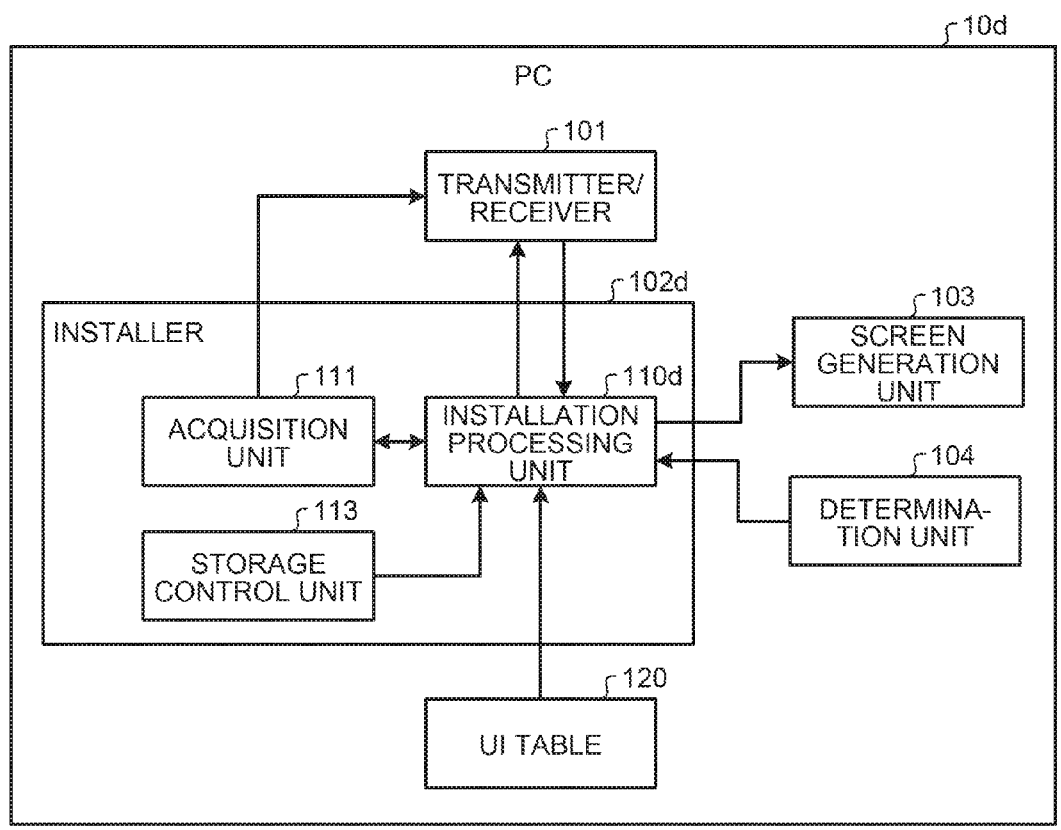
FIG. 29 is an exemplary functional block diagram for explaining functions of a PC according to the fourth embodiment.

FIG. 29 is an exemplary functional block diagram for explaining the functions of the PC 10d according to the fourth embodiment. The PC 10d includes the transmitter/receiver 101, an installer 102d, the screen generation unit 103, the determination unit 104, and a UI table 120. Components shown in FIG. 29 that are common with those shown in FIG. 4 are denoted with the reference numerals shown in FIG. 4 to omit detailed descriptions. According to FIG. 29, the UI table 120 associates sets of apparatus specifying information with UI types. Here, for descriptions, it is assumed that the UI table 120 has the same configuration as that of the UI table 203 described with reference to FIG. 3.

From among the components of the PC 10d, the transmitter/receiver 101, the installer 102d, the screen generation unit 103, and the determination unit 104 can be configured by using a program that runs on a CPU. Alternatively, part or all of the transmitter/receiver 101, the installer 102d, the screen generation unit 103, and the determination unit 104 may be configured by using hardware.

The installer 102d installs the driver program corresponding to the printer apparatus 30a in the PC 10d. The installer 102 includes an installation processing unit 110d, the acquisition unit 111, and a storage control unit 113. The storage control unit 113 is capable of controlling reading/writing data from/to the storage medium of the PC 10d, such as the storage 1006, the ROM 1002 or the RAM 1003. For example, the driver program corresponding to the printer apparatus 30a and multiple sets of UI unit configuration data are stored in the storage 1006. The storage control unit 113 reads the driver programs and the UI unit configuration data from the storage 1006.

The transmitter/receiver 101, the installer 102d, the screen generation unit 103, and the determination unit 104 that are described above are implemented by using a program that runs on the CPU 1001. The program, the UI table 120, and each set of data and the program that are stored in the storage 1006 may be stored in a computer that is connected to the network 40 to which the communication I/F 1009 is connected, may be configured to be downloaded by the PC 10d via the network 40 and thus provided, or may be configured to be provided or distributed via the network 40. Alternatively, the program may be recorded in a non-transitory computer-readable recording medium, such as a CD or a DVD, in a file in an installable or an executable form and thus provided.

The program has, for example, a module configuration including the above-described units (the transmitter/receiver 101, the installer 102d, the screen generation unit 103, and the determination unit 104). As for practical hardware, the CPU 1001 reads the program from, for example, the storage 1006 and executes the program so that the above-described units are loaded into the main storage device (such as the RAM 1003) and the units are generated in the main storage device.

Figure 30:
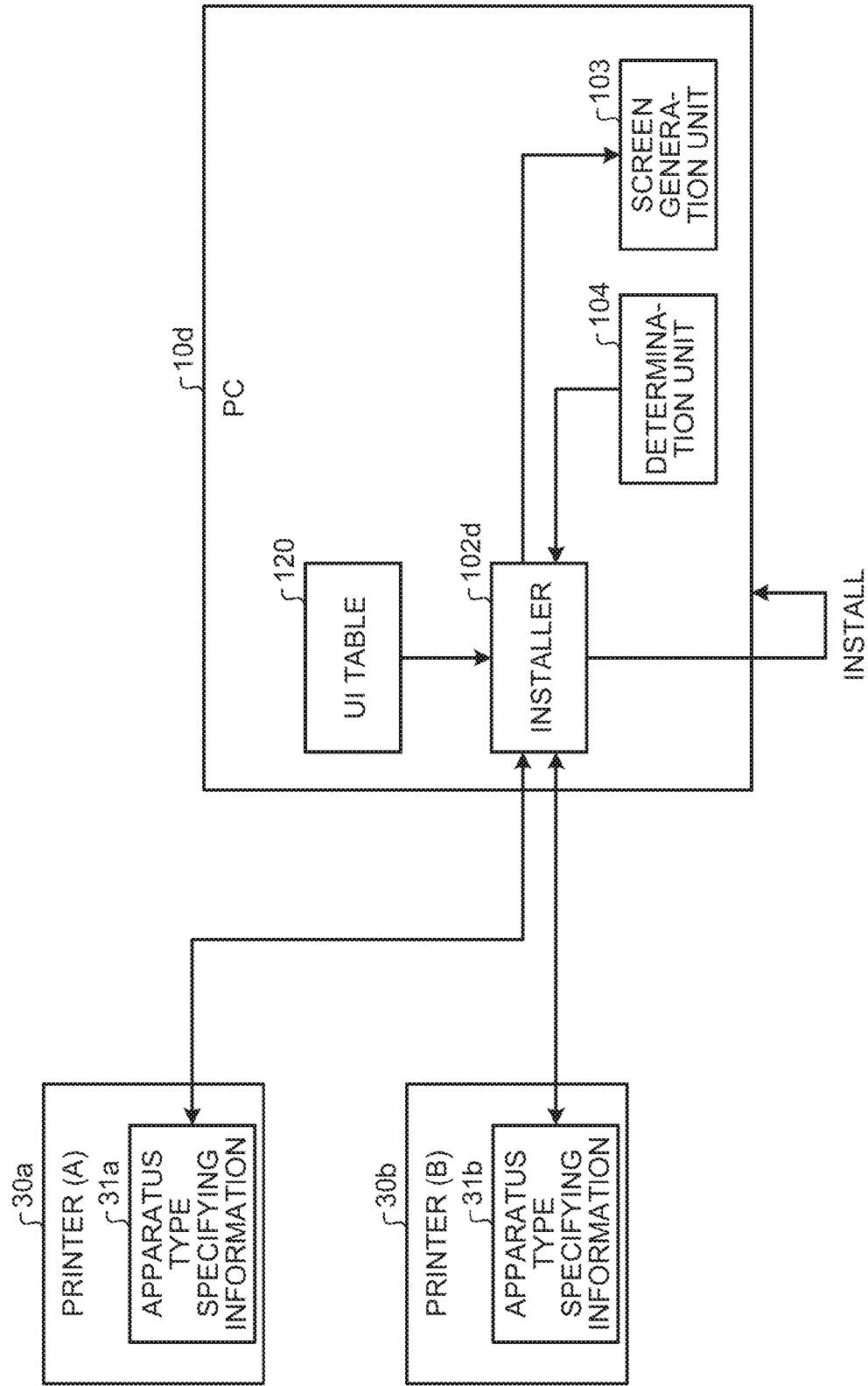
FIG. 30 is a diagram for schematically explaining an installation process according to the fourth embodiment.

With reference to FIG. 30, an installation process according to the fourth embodiment will be described schematically. As shown in FIG. 30, the installer 102d of the PC 10d communicates with each of the printer apparatuses 30a and 30b that are connected to the network 40 to acquire each of the sets of apparatus type specifying information 31a and 31b on the printer apparatuses 30a and 30b. According to the acquired sets of apparatus type specifying information 31a and 31b, the installer 102d refers to the UI table 120 and determines an UI type to be used for the driver program that corresponds to the printer apparatus 30a and that is to be installed in the PC 10d.

When the determined UI type is different from the UI type that is associated with the apparatus type specifying information 31b on the already-introduced printer apparatus 30b, the installer 102d replaces the UI unit of the driver program corresponding to the printer apparatus 30a to be additionally introduced with the UI unit of the driver program corresponding to the already-introduced printer apparatus 30b. The installer 102d installs the driver program whose UI unit has been replaced in the PC 10d.

Figure 31:
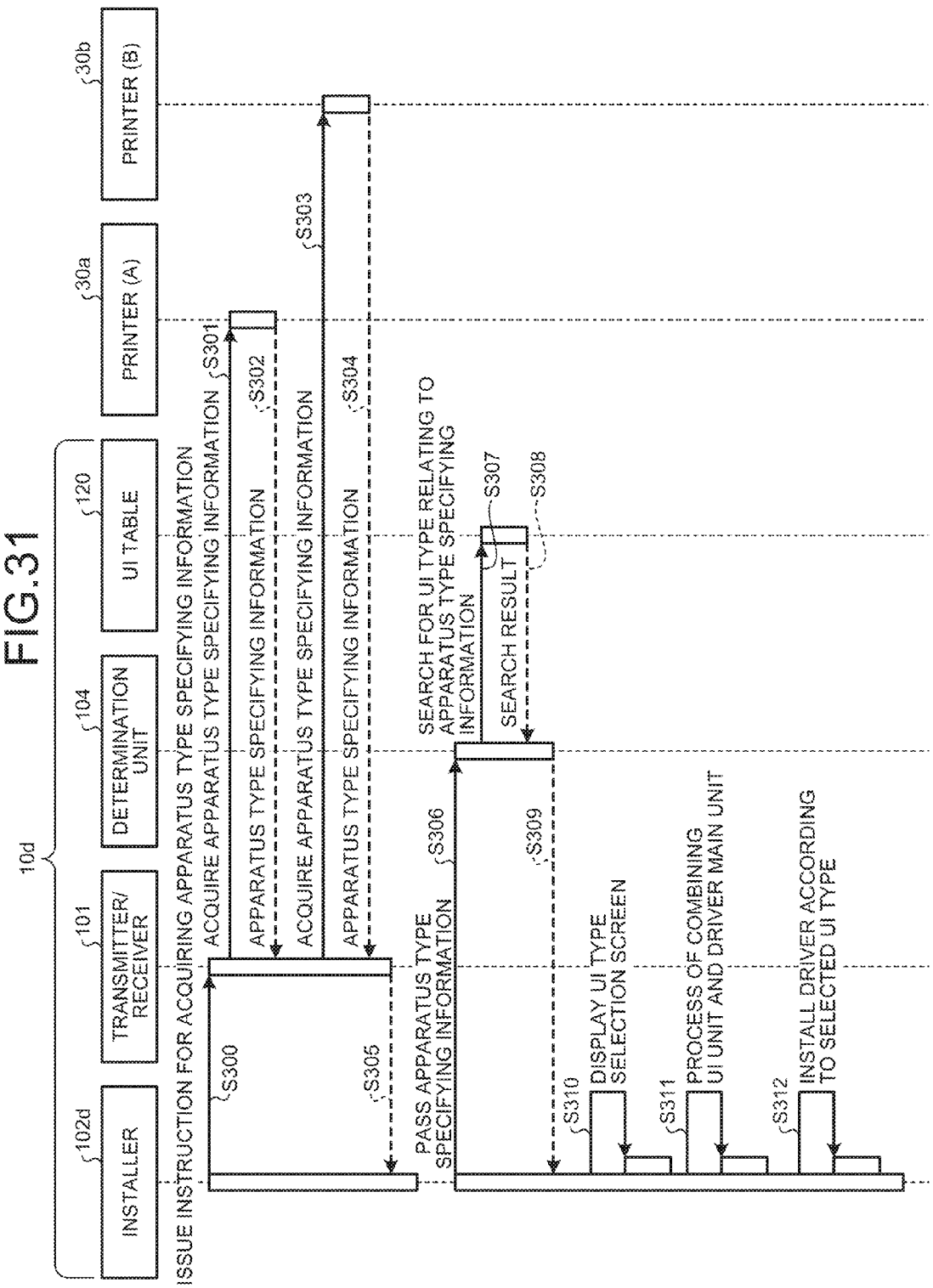
FIG. 31 is an exemplary sequence chart of sets of processing according to the fourth embodiment.

FIG. 31 is an exemplary sequence chart of sets of processing according to the fourth embodiment. Components shown in FIG. 31 that are common with those shown in FIGS. 29 and 30 are denoted with the same reference numerals as those shown in FIGS. 29 and 30 to omit detailed descriptions. For example, in the PC 10d, the installer 102d is started and an instruction for installing the driver program corresponding to the printer apparatus 30a is issued, so that the process according to the sequence shown in FIG. 31 is started.

Once the instruction for installing the driver program is issued, the installer 102d detects apparatus type specifying information from each apparatus on the network 40 and acquires the detected apparatus type specifying information (steps S300 to S305). According to the example, the installer 102d acquires the sets of apparatus type specifying information 31a and 31b from the printer apparatuses 30a and 30b. The installer 102d passes all of the acquired sets of apparatus type specifying information 31a and 31b to the determination unit 104 (step S306).

The determination unit 104 refers to the UI table 120 according to the passed sets of apparatus type specifying information 31a and 31b and searches for the UI types associated respectively with the sets of apparatus type specifying information 31a and 31b (steps S307 and S308). The determination unit 104 passes the search result to the installer 102d (step S309).

The installer 102d causes the screen generation unit 103 to generate a selection screen for selecting an UI type to be used for the driver program to be installed from among the passed UI types. The generated selection screen is displayed on the display 1005 (step S310). Here, it is assumed that the screen generation unit 103 generates a screen equivalent to the selection screen 50 described with reference to FIG. 8. The determination unit 104 sends back the UI type that is selected according to a user operation on the selection screen displayed on the display 1005 to the installer 102d as the selection result.

The installer 102d fetches, from the storage 1006, the configuration data of the UI unit corresponding to the UI type represented by the selection result sent back from the determination unit 104 and the driver main unit of the driver program corresponding to the printer apparatus 30a and combines the fetched UI unit and the driver main unit to generate a single driver program (step S311). The installer 102d installs the generated driver program in the PC 10d (step S312).

Figure 32:
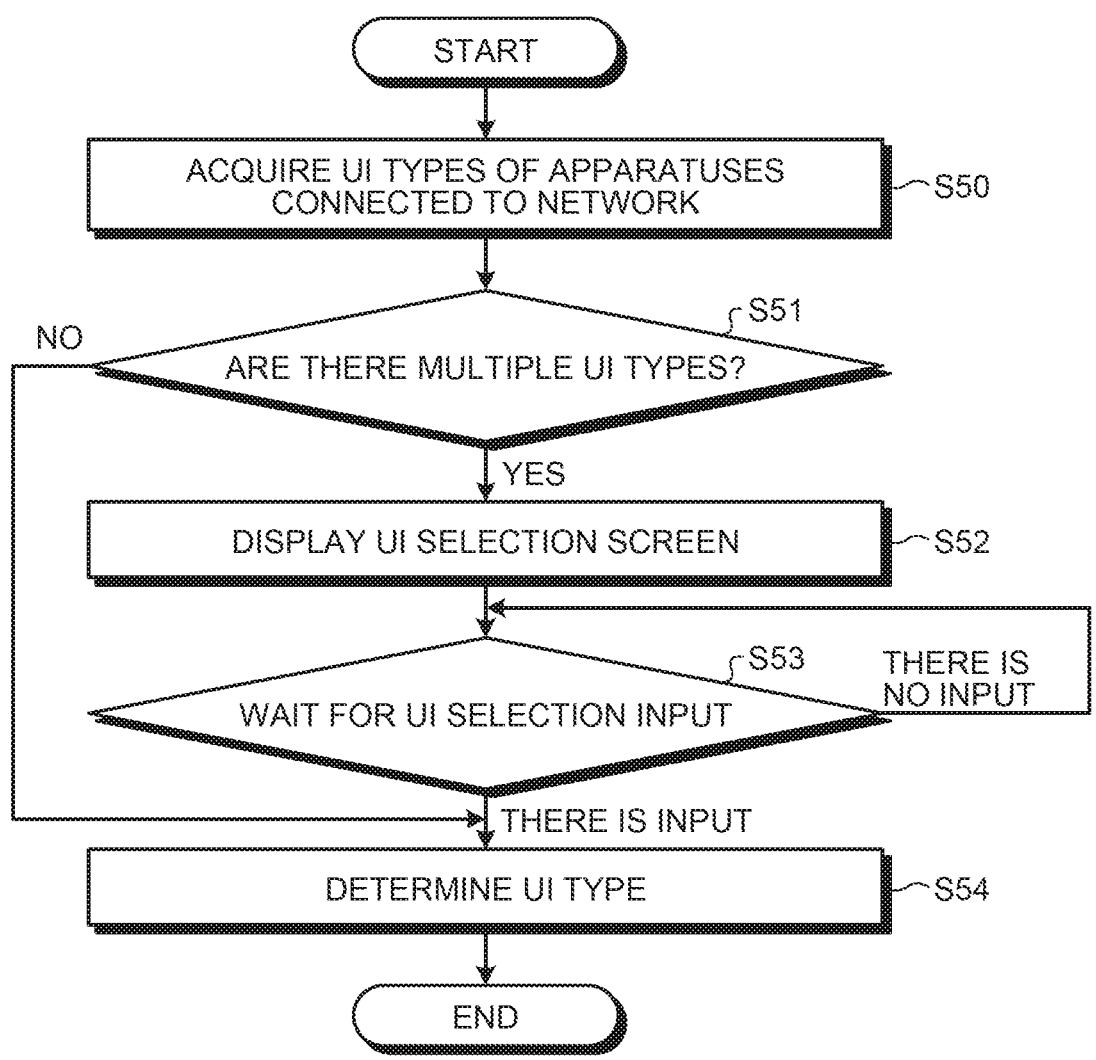
FIG. 32 is an exemplary flowchart of a process of determining display/non-display of a selection screen according to the fourth embodiment.

According to the fourth embodiment, according to the UI type passed from the determination unit 104 at step S309, the installer 102d determines whether to display the selection screen 50 for selecting a UI type. FIG. 32 shows an exemplary flowchart of a process of determining display/non-display of a selection screen according to the fourth embodiment.

At step S50, the installer 102d acquires the UI types corresponding respectively to apparatuses connected to the network 40 (corresponding to steps S306 to step S309 shown in FIG. 31). At step S51, the installer 102d determines whether there is an UI type different from the UI type corresponding to the driver program to be installed by the installer 102d among the UI types acquired at step S50.

Upon determining, at step S51, that there is such a different UI type, the installer 102d moves the process to step S52. At step S52, the installer 102d displays an UI type selection screen (corresponding to step S310 shown in FIG. 31) and, at the next step S53, waits for a selection input according to a user operation on the selection screen. Upon determining that there is no input, the installer 102d returns the process to step S53. Upon determining that there is an input, the installer 102d moves the process to step S54.

At step S54, the installer 102d determines an UI type to be used for the driver program to be installed. For example, when the installer 102d moves the process from step S53 to step S54, the installer uses the UI type selected on the UI type selection screen as an UI type to be used for the driver program to be installed.

On the other hand, upon determining that there is no such a different UI type at step S51, the installer 102d moves the process to step S54. In this case, the selection screen for selecting an UI type is not displayed. When the installer 102d moves the process directly from step S51 to step S54, the installer 102d uses the original UI type of the driver program as the UI type of the program to be installed.

According to the fourth embodiment, even when the driver program corresponding to a specific printer apparatus is to be installed in a PC, it is possible to select an UI type to be used for the driver program from the original UI type of the driver program and the UI type corresponding to the driver program corresponding to the already-introduced printer apparatus. For this reason, the work of the process of installing the driver program corresponding to the printer apparatus to be additionally introduced and of operations on the installed program can be reduced.

According to the embodiment, there is an effect that a work of a user to perform operations on an UI can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus, connectable to a plurality of apparatuses, a control program for issuing a request for a process to an apparatus corresponding to any one of the plurality of apparatuses being transmittable from a server, the information processing apparatus comprising:
   a processor configured to execute computer-readable instructions to
      acquire, from each of the plurality of apparatuses connected with the information processing apparatus, apparatus type specifying information that specify apparatus type of each of the plurality of apparatuses;
      identify the apparatus types of the plurality of apparatuses including a first apparatus type being an apparatus type of an apparatus configured to perform controlling thereof by the control program from the server and a second apparatus type different from the first apparatus type;
      specify, according to the plurality of apparatus type-specifying information on the apparatus types identified and correspondence information associating each of the plurality of apparatus type specifying information with a respective one of the plurality of types of user interfaces for accepting a setting relating to a process required to the apparatus, a first type of the types of user interfaces corresponding to the first apparatus type and a second type of the types of user interfaces corresponding to the second apparatus type; and
      determine types of user interfaces displayed by the control program from the server configured to control apparatuses of the first apparatus type, from among the first type of the types of user interfaces and the second types of the types of user interfaces.

2. The information processing apparatus of claim 1, wherein the processor is further configured to execute computer-readable instructions to generate a screen on which a selection input section is displayed.

3. The information processing apparatus of claim 2, wherein the screen is a screen on which the first apparatus type corresponding to the first type and the second apparatus type corresponding to the second type are identifiably displayable and via which any one of the first type and the second type is selectable, via the selection input section, by a user.

4. The information processing apparatus of claim 3, wherein an image representing the first type and an image representing the second type are displayable on the screen.

5. The information processing apparatus of claim 1, wherein the processor is configured to execute computer-readable instructions to further determine a relatively older one of the first type and the second type as a type of user interface to be used for the first apparatus type.

6. The information processing apparatus of claim 1, wherein the processor is configured to execute computer-readable instructions to
make a setting in an apparatus control unit useable to control the connected apparatuses, and
combine the user interface of the type determined to the apparatus control unit.

7. The information processing apparatus of claim 1, wherein the processor is configured to execute computer-readable instructions to further specify a type different from the first type among the types corresponding to the second apparatus type as the second type.

8. The information processing apparatus of claim 2, wherein the selection screen is not displayed when the second type matches the first type.

9. A non-transitory computer-readable recording medium containing an information processing program to, when executed, cause a computer included in an information processing apparatus, connectable to a plurality of apparatuses and to which a control program for issuing a request for a process to an apparatus corresponding to any one of the plurality of apparatuses is transmittable from a server, to perform an information processing method comprising:
acquiring, from each of the plurality of apparatuses connected with the information processing apparatus, apparatus type specifying information that specify apparatus type of each of the plurality of apparatuses;
identifying the apparatus types of the plurality of apparatuses including a first apparatus type being an apparatus type of an apparatus configured to perform controlling thereof by the control program from the server and a second apparatus type different from the first apparatus type;
specifying, according to the plurality of apparatus type specifying information on the apparatus types identified and correspondence information associating each of the plurality of apparatus type specifying information with a respective one of the plurality of types of user interfaces for accepting a setting relating to a process required to the apparatus, a first type of the types of user interfaces corresponding to the first apparatus type and a second type of the types of user interfaces corresponding to the second apparatus type; and
determining types of user interfaces displayed by the control program from the server configured to control apparatuses of the first apparatus type, from among the first type of the types of user interfaces and the second types of the types of user interfaces.

10. An information processing system comprising:
a storage unit to store correspondence information associating each of a plurality of apparatus type specifying information specifying apparatus types of a plurality of connectable apparatuses with a respective one of a plurality of types of user interfaces for accepting a setting relating to a process required to the apparatus;
a processor configured to execute computer-readable instructions to
acquire, from each of the plurality of apparatuses connected with the information processing apparatus, apparatus type specifying information that specify apparatus type of each of the plurality of apparatuses;
identify the apparatus types of the plurality of connectable apparatuses into a first apparatus type being an apparatus type of an apparatus configured to perform controlling thereof by a control program for issuing a request for a process to an apparatus corresponding to any one of the plurality of apparatuses;
specify, according to the plurality of apparatus type specifying information on the apparatus types identified and the correspondence information, a first type of the types of user interfaces corresponding to the first apparatus type and a second type of the types of user interfaces corresponding to the second apparatus type; and
determine types of user interfaces displayed by the control program from the server configured to control apparatuses of the first apparatus type, from among the first type of the types of user interfaces and the second types of the types of user interfaces.

11. The non-transitory computer-readable recording medium of claim 9, wherein the information processing method further includes:
determining a relatively older one of the first type and the second type as a type of user interface to be used for the first apparatus type.

12. The non-transitory computer-readable recording medium of claim 9, wherein the information processing method further includes:
making a setting in an apparatus control unit-useable to control the connected apparatuses, and
combining the user interface of the type determined to the apparatus control unit.

13. The information processing system of claim 10, wherein the processor is configured to execute computer-readable instructions to further determine a relatively older one of the first type and the second type as a type of user interface to be used for the first apparatus type.

14. The information processing system of claim 10, wherein the processor is configured to execute computer-readable instructions to
make a setting in an apparatus control unit useable to control the connected apparatuses, and
combine the user interface of the type determined to the apparatus control unit.

15. The non-transitory computer-readable recording medium of claim 9, wherein the information processing method further includes:
generating a screen on which a selection input section is displayed, wherein the screen is a screen on which the first apparatus type corresponding to the first type and the second apparatus type corresponding to the second type are identifiably displayable and via which any one of the first type and the second type is selectable, via the selection input section, by a user.

16. The information processing system of claim 10, wherein the processor is configured to execute computer-readable instructions to
generate a screen on which a selection input section is displayed, wherein the screen is a screen on which the first apparatus type corresponding to the first type and the second apparatus type corresponding to the second type are identifiably displayable and via which any one of the first type and the second type is selectable, via the selection input section, by a user.

\* \* \* \* \*